US011093479B2

(12) United States Patent
Thapar et al.

(10) Patent No.: US 11,093,479 B2
(45) Date of Patent: Aug. 17, 2021

(54) LEDGER DATA GENERATION AND STORAGE FOR TRUSTED RECALL OF PROFESSIONAL PROFILES

(71) Applicant: Workday, Inc., Pleasanton, CA (US)

(72) Inventors: Parvinder Singh Thapar, Dublin, CA (US); Bradley Hoyle, Danville, CA (US); Dirk Nicholas Dougherty, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 191 days.

(21) Appl. No.: 16/182,406

(22) Filed: Nov. 6, 2018

(65) Prior Publication Data

US 2020/0142884 A1 May 7, 2020

(51) Int. Cl.
*G06F 17/00* (2019.01)
*G06F 16/23* (2019.01)
(Continued)

(52) U.S. Cl.
CPC ........ *G06F 16/2365* (2019.01); *G06F 21/602* (2013.01); *G06Q 10/1053* (2013.01);
(Continued)

(58) Field of Classification Search
CPC ............ G06F 16/2365; G06F 16/2379; G06F 21/602; G06F 16/27; G06F 21/645; G06F 21/6218; G06Q 10/1053; G06Q 30/018; G06Q 2220/00; H04L 9/0637; H04L 2209/38; H04L 9/3239; H04L 63/102; H04L 63/12
See application file for complete search history.

(56) References Cited

U.S. PATENT DOCUMENTS

| 7,809,882 | B1* | 10/2010 | Liu | G06F 12/0866 |
| | | | | 711/113 |
| 2006/0042483 | A1* | 3/2006 | Work | G06F 16/24578 |
| | | | | 101/91 |

(Continued)

FOREIGN PATENT DOCUMENTS

| CN | 109409831 A | * | 3/2019 |
| CN | 110188109 A | * | 8/2019 |

OTHER PUBLICATIONS

Grech, Alexander and A. Camilleri. "Blockchain in Education." (2017). <https://web.archive.org/web/20171117085708/https://publications.jrc.ee.europa.eu/repository/bitstream/JRC108255/jrc108255_blockchain_in_education(1).pdf> (Year: 2017).*

(Continued)

*Primary Examiner* — Syed H Hasan
(74) *Attorney, Agent, or Firm* — Van Pelt, Yi & James LLP

(57) ABSTRACT

A system for ledger data includes a block repository, a metadata database, and a processor. The block repository stores verified secure ledger data in one or more blocks that are cryptographically linked. The metadata database stores metadata information for the one or more blocks in the block repository. The processor is configured to receive a request to create a block content and to determine the block content for a block to be stored in the block repository and metadata content to be stored in the metadata database associated with the block to be stored in the block repository. The metadata content includes one or more flags and source information.

23 Claims, 14 Drawing Sheets

(51) Int. Cl.
  *G06Q 10/10* (2012.01)
  *H04L 9/06* (2006.01)
  *G06F 21/60* (2013.01)
  *G06Q 30/00* (2012.01)
(52) U.S. Cl.
  CPC ......... *G06Q 30/018* (2013.01); *H04L 9/0637* (2013.01); *H04L 2209/38* (2013.01)

(56) References Cited

U.S. PATENT DOCUMENTS

| | | | |
|---|---|---|---|
| 2013/0224718 A1* | 8/2013 | Woodward | G09B 7/00 434/350 |
| 2016/0027229 A1 | 1/2016 | Spanos | |
| 2017/0264428 A1* | 9/2017 | Seger, II | G06F 16/13 |
| 2018/0075527 A1* | 3/2018 | Nagla | G06Q 40/025 |
| 2018/0082256 A1* | 3/2018 | Tummuru | G06Q 10/1053 |
| 2018/0204213 A1 | 7/2018 | Zappier | |
| 2019/0044727 A1* | 2/2019 | Scott | H04L 9/3247 |
| 2019/0087558 A1* | 3/2019 | Mercury | G06N 20/00 |
| 2019/0103973 A1* | 4/2019 | Chalkias | H04L 9/0618 |
| 2019/0280854 A1* | 9/2019 | Wadhwa | H04L 9/3239 |
| 2020/0007336 A1* | 1/2020 | Wengel | G06F 16/1824 |
| 2020/0111043 A1* | 4/2020 | Cheeks | G06N 3/0454 |

OTHER PUBLICATIONS

Durant et al. "Digital Diploma debuts at MIT." (2017) <https://web.archive.org/web/20171018121218/https://news.mit.edu/2017/mit-debuts-secure-digital-diploma-using-bitcoin-blockchain-technology-1017> (Year: 2017).*

Partz, Helen. "Russia: Financial University to Store Diplomas via Blockchain." (Jun. 2018) <https://web.archive.org/web/20180627215251/https://cointelegraph.com/news/russia-financial-university-to-store-diplomas-via-blockchain> (Year: 2018).*

* cited by examiner

LEDGER DATA GENERATION AND
STORAGE FOR TRUSTED RECALL OF
PROFESSIONAL PROFILES

BACKGROUND OF THE INVENTION

Employers today face a major hiring hurdle in verifying information on a candidate's resume. Surveys and reports conducted by companies in the recruiting and hiring industry show that over half of candidates seeking employment lie on their resumes and that screening uncovered lies or misrepresentations on a resume for 86% of employers.

The inability to trust basic information presented on resumes and cover letters adds a massive strain to the entire hiring process. Current efforts to verify credentials cost an employer significant time and money. For example, in a typical recruiting process, substantial recruiter time is invested to review, screen, and assess candidates even before an employer brings the candidate in for an interview. A successful interview is often followed by a reference check and hopefully an offer for employment, after which an employer will typically spend additional time and money to conduct a background check before the candidate is actually hired.

In light of the substantial cost in time and money expended by employers in current recruiting and hiring practices, an approach that addresses the problem presented by the inability to trust information on a candidate's resume would greatly reduce the burden currently shouldered by the recruiting and hiring industry in verifying a candidate's credentials.

BRIEF DESCRIPTION OF THE DRAWINGS

Various embodiments of the invention are disclosed in the following detailed description and the accompanying drawings.

DETAILED DESCRIPTION

Figure 1A:
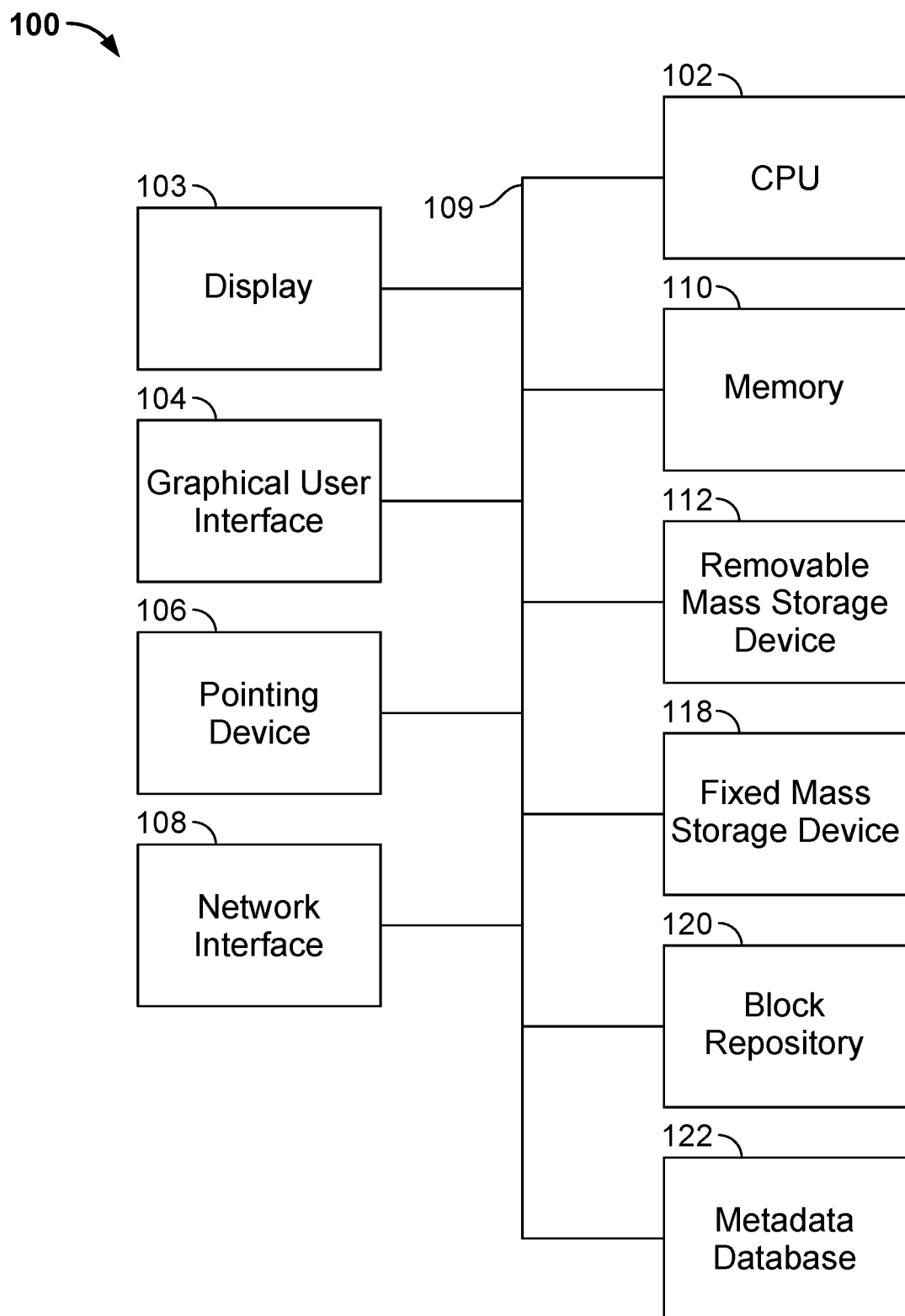
FIG. 1A is a block diagram of a computer system 100 used in some embodiments for ledger generation and storage for trusted recall.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The technique disclosed herein addresses the problem presented by an inability to trust and verify data being presented, stored and retrieved in applications where trusted storage and recall of data is critical. In particular, the disclosed technique solves this technical problem by providing storage, retrieval, and display of true and verified candidate information (also known as a Professional Profile) that companies can use for various purposes including recruiting or hiring, or for their own internal needs. Candidate information includes relevant background information about a candidate including education (e.g., degree, diploma, certifications, and other educational information), work history, skills, professional certifications, and licenses, etc. The disclosed technique allows institutions, companies, and other participating entities to publish candidate information (e.g., education, hiring, promotion, and other candidate information) on their own database as well as on a private cryptographically encrypted data repository (e.g., a Block Repository or Blockchain) with a valid and signed certificate. The technique also provides an ability for trusted recall including retrieving candidate information from trusted storage (e.g., a cryptographically encrypted data repository) and for displaying cryptographically-authenticated information in a special way that separates it from non-verified, non-blockchain, authenticated information.

In addition to recruiting and hiring applications as mentioned above, the disclosed technique more generally provides for the storage, retrieval, and display of true and verified information or ledger data that can be used for profiling or for other applications where the ability to trust and verify data being stored and retrieved is critical. More specifically, a system for ledger data is provided comprising: a block repository, wherein the block repository stores verified secure ledger data in one or more blocks that are cryptographically linked; a metadata database, wherein the metadata database stores metadata information for a block of the one or more blocks in the block repository; and a processor configured to receive a request to create a block content and to determine the block content for a block to be stored in the block repository and metadata content to be stored in the metadata database associated with the block to be stored in the block repository, wherein the metadata content includes one or more flags and source information. In some embodiments, the processor is configured to receive an indication to check data in a block and to mark the block as being verified in the metadata information associated with the block. In some embodiments, the processor is configured to receive an indication to share data in a block and to mark the block as sharable in the metadata information associated with the block.

In some applications as discussed in more detail below, the storage of verified, secure ledger data in blocks that are cryptographically linked in a block repository or blockchain provides a mechanism for capturing candidate information based on the candidate's life events. In particular, the system is configured to receive a set of fields associated with a professional profile (e.g., relevant skills, background, and experience) of a person on a trigger of certain life events such as graduating from college, getting hired, getting a promotion, and/or other relevant life events. The candidate information is captured at the completion of the candidate's life events via an irreversible and immutable record of the transaction that adds a block to the block repository or blockchain. Components of an exemplary system for the storage, retrieval, and display of verified secure ledger data are described below in further detail with respect to FIG. 1A.

FIG. 1A is a block diagram of a computer system 100 used in some embodiments for ledger generation and storage for trusted recall. In particular, FIG. 1A illustrates one embodiment of a general purpose computer system for the storage, retrieval and display of true and verified information or ledger data. Other computer system architectures and configurations can be used for carrying out the processing of the disclosed technique. Computer system 100, made up of various subsystems described below, includes at least one CPU 102 (e.g., a microprocessor subsystem also referred to as a central processing unit or CPU). That is, CPU 102 can be implemented by a single-chip processor or by multiple processors. In some embodiments, CPU 102 is a general purpose digital processor which controls the operation of the computer system 100. Using instructions retrieved from memory 110, CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by CPU 102 to perform its functions. Primary storage devices (e.g., Memory 110) may include any suitable computer-readable storage media, described below, depending on whether, for example, data access needs to be bi-directional or uni-directional. CPU 102 can also directly and very rapidly retrieve and store frequently needed data in a cache memory (not shown).

Removable mass storage device 112 provides additional data storage capacity for computer system 100, and is coupled either bi-directionally (read/write) or uni-directionally (read only) to CPU 102. Removable mass storage device 112 may also include computer-readable media such as magnetic tape, flash memory, signals embodied on a carrier wave, PC-CARDS, portable mass storage devices, holographic storage devices, and other storage devices. Fixed mass storage device 118 can also provide additional data storage capacity. The most common example of mass storage is a hard disk drive. Removable mass storage device 112 and fixed mass storage device 118 generally store additional programming instructions, data, and the like that typically are not in active use by CPU 102. It will be appreciated that the information retained within removable mass storage device 112 and fixed mass storage device 118 may be incorporated, if needed, in standard fashion as part of primary storage in memory 110 (e.g. RAM) as virtual memory.

In addition to providing CPU 102 access to storage subsystems, bus 109 can be used to provide access other subsystems and devices as well. In the described embodiment, these can include display 103, graphical user interface 104, pointing device 106, and network interface 108, as well as an auxiliary input/output device interface, a sound card, speakers, and other subsystems as needed. Pointing device 106 may be a mouse, stylus, track ball, or tablet, and is useful for interacting with graphical user interface 104.

In some embodiments, a request to create a block content is received as an input to the computer system 100 and CPU 102 determines the block content for a block (not shown) to be stored in a block repository or blockchain (e.g. Block Repository 120) and metadata content to be stored in a database (e.g., Metadata Database 122) associated with the block. In some cases, the metadata content includes one or more flags and source information. Block Repository 120 is configured to store verified secure ledger data in one or more blocks that are cryptographically linked. Additionally, Metadata Database 122 is configured to store metadata information for a block of the one or more blocks in Block Repository 120.

Network interface 108 allows CPU 102 to be coupled to another computer, computer network, or telecommunications network using a network connection as shown. Through network interface 108, it is contemplated that CPU 102 might receive information—for example, data objects or program instructions, from another network, or might output information to another network in the course of performing the above-described method steps. Information, often represented as a sequence of instructions to be executed on CPU 102, may be received from and outputted to another network, for example, in the form of a computer data signal embodied in a carrier wave. An interface card or similar device and appropriate software implemented by CPU 102 can be used to connect computer system 100 to an external network and transfer data according to standard protocols. That is, method embodiments of the disclosed technique may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 108.

An auxiliary I/O device interface (not shown) can be used in conjunction with computer system 100. The auxiliary I/O device interface can include general and customized interfaces that allow CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the disclosed technique further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the disclosed technique, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

Accordingly, in some embodiments, a computer program product for a ledger data system is provided, the computer program product being embodied in a non-transitory computer readable storage medium and comprising computer instructions for: receiving a request to create a block content; and determining, using a processor, the block content for a block to be stored in a block repository and metadata content to be stored in a metadata database associated with the block, wherein the metadata content includes one or more flags and source information, wherein the block repository stores verified secure ledger data in one or more blocks that are cryptographically linked, and wherein the metadata database stores metadata information for a block of the one or more blocks in the block repository.

In some examples, a computer program product for a ledger data system is provided, the computer program product being embodied in a non-transitory computer readable storage medium and comprising computer instructions for: receiving an indication to check data in a block; and marking, using a processor, the block as being verified and accurate in metadata information associated with the block of a block repository, wherein the block repository stores verified secure ledger data in one or more blocks that are cryptographically linked, wherein a metadata database stores the metadata information for a block of the one or more blocks in the block repository.

In other examples, a computer program product for a ledger data system is provided, the computer program product being embodied in a non-transitory computer readable storage medium and comprising computer instructions for: receiving an indication to share data in a block; and marking, using the processor, the block as sharable in metadata information associated with the block in a block repository, wherein the block repository stores verified secure ledger data in one or more blocks that are cryptographically linked, and wherein a metadata database stores the metadata information for the block of the one or more blocks in the block repository.

Note that the computer system shown in FIG. 1A is but an example of a computer system suitable for use with the disclosed technique. Other computer systems suitable for use with the disclosed technique may include additional or fewer subsystems. In addition, bus 109 is illustrative of any interconnection scheme serving to link the subsystems. Other computer architectures having different configurations of subsystems may also be utilized and such systems may be used to practice exemplary methods as described herein. In the example that follows, a system is depicted for storing ledger data such as candidate information in a candidate profile for employment purposes that includes use of a network.

Figure 1B:
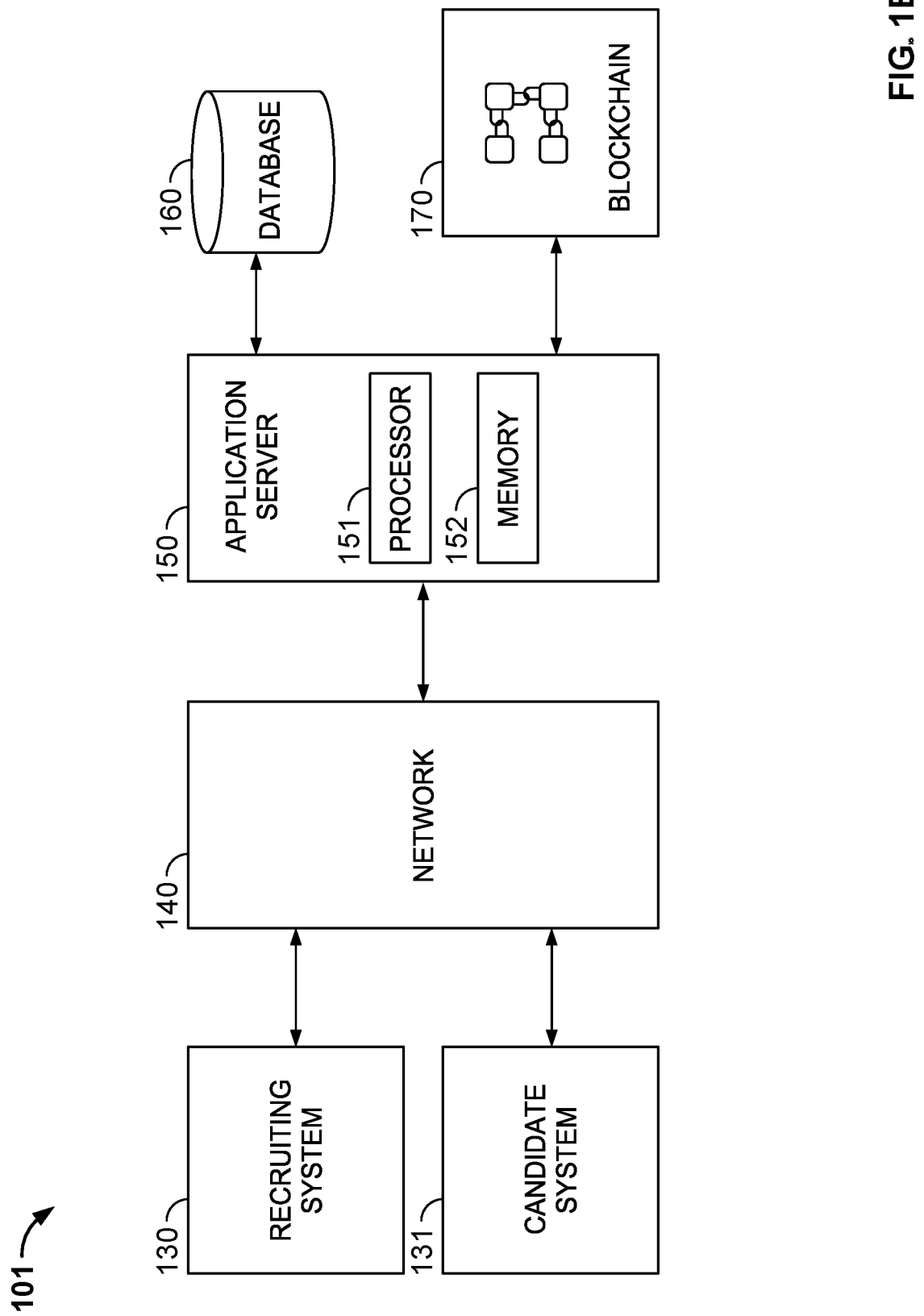
FIG. 1B depicts exemplary system 101 that uses network 140 and can be used for ledger generation and storage for trusted recall, including storing ledger data such as candidate information in a candidate profile.

FIG. 1B depicts exemplary system 101 that uses network 140 and can be used for ledger generation and storage for trusted recall, including storing ledger data such as candidate information in a candidate profile.

In some embodiments, system 101 for ledger generation and storage for trusted recall includes recruiting system 130 and candidate system 131 configured to be connected to or in communication with application server 150 via network 140. As will be described in further detail below, each of recruiting system 130 and the candidate system 131 can include an input interface for inputting data or information into each system, and an output interface, for displaying data or information to a user of each system. Although not shown, each of the recruiting system 130 and candidate system 131 can also include a processor for processing information and a memory and/or database for storing information.

In this case, as shown in FIG. 1B, application server 150 includes processor 151 and memory 152. Application server 150 is configured to be connected to or in communication with application database 160 and a block repository (e.g., blockchain 170). In some embodiments, application database 160, stores metadata information for a block of the one or more blocks in the block repository (e.g., blockchain 170) and the block repository stores verified secure ledger data in one or more blocks that are cryptographically linked. Processor 151 is configured to receive a request to create a block content and to determine the block content for a block to be stored in the block repository (e.g., blockchain 170) and metadata content to be stored in the metadata database (e.g., application database 160) associated with the block to be stored in the block repository (e.g., blockchain 170). In this example, metadata content includes one or more flags and source information as will be described in more detail in the examples that follow.

In some embodiments, the request to create a block content is received from a requestor. For example, in the case of generating a candidate profile for recruiting, hiring, or employment purposes, a requestor can be the candidate seeking to view his or her own profile, an institution conferring a degree to the candidate, or a corporation that hired the candidate as an employee. System 101 is configured to receive a request from a requestor, who can input or provide a request to create block content using candidate system 131. Although not shown, an educational institution or corporation may also have access to an institution system or corporation system respectively, from which a requestor sends a request to create a block content. Each of these systems has an input interface, an output interface, a processor, and a memory and/or database. In the example shown, a request to create a block content is received by candidate system 131 and provided to application server 150 via network 140. More specifically, the request to create a block content is received and processed by processor 151, which determines the block content for a block to be stored in blockchain 170 and metadata content to be stored in application database 160.

Figure 2A:
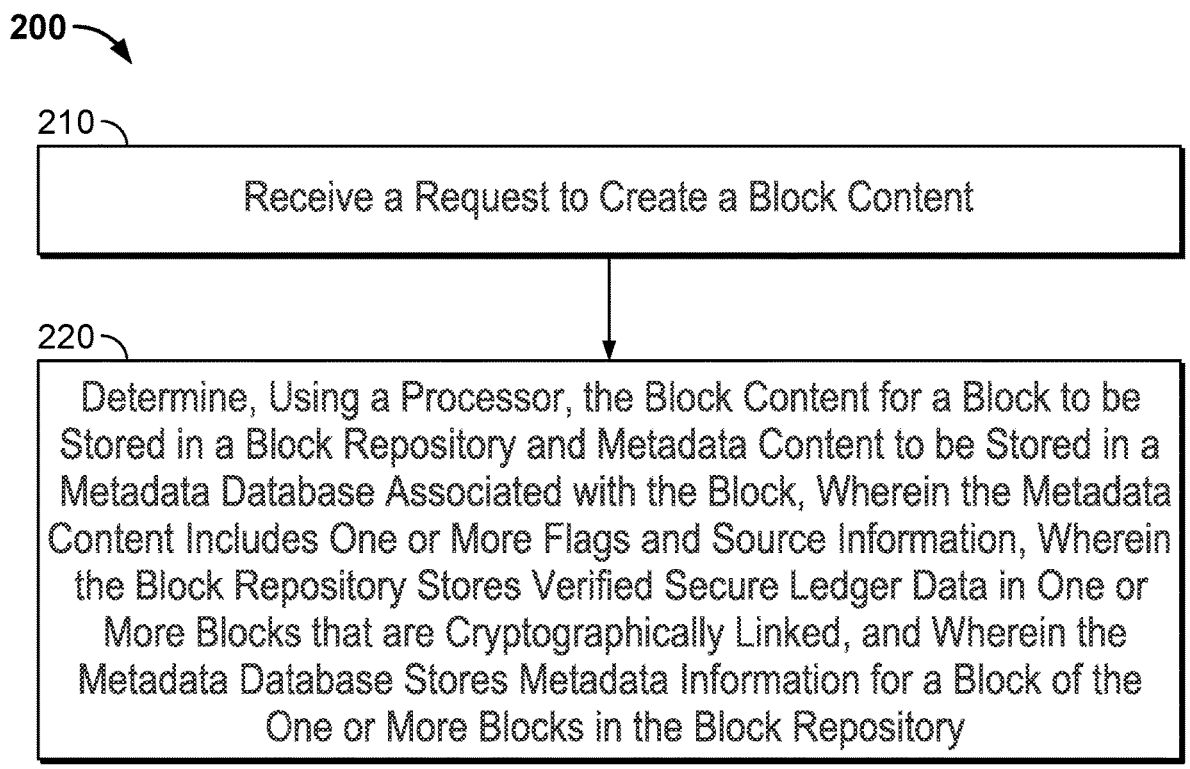
FIG. 2A is a flowchart of exemplary method 200 for ledger generation and storage for trusted recall that can be performed by the exemplary systems depicted in FIGS. 1A-1B that includes determining content to be stored.

FIG. 2A is a flowchart of exemplary method 200 for ledger generation and storage for trusted recall that can be performed by the exemplary systems depicted in FIGS. 1A-1B that includes determining content to be stored. As shown in FIG. 2A, method 200 includes: receiving a request to create a block content at 210 and determining, using a processor, the block content for a block to be stored in a block repository and metadata content to be stored in a metadata database associated with the block at 220, wherein the metadata content includes one or more flags and source information. Additionally, in the example shown, and as will be described in more detail below, the block repository stores verified secure ledger data in one or more blocks that are cryptographically linked and the metadata database stores metadata information for a block of the one or more blocks in the block repository.

Figure 2B:
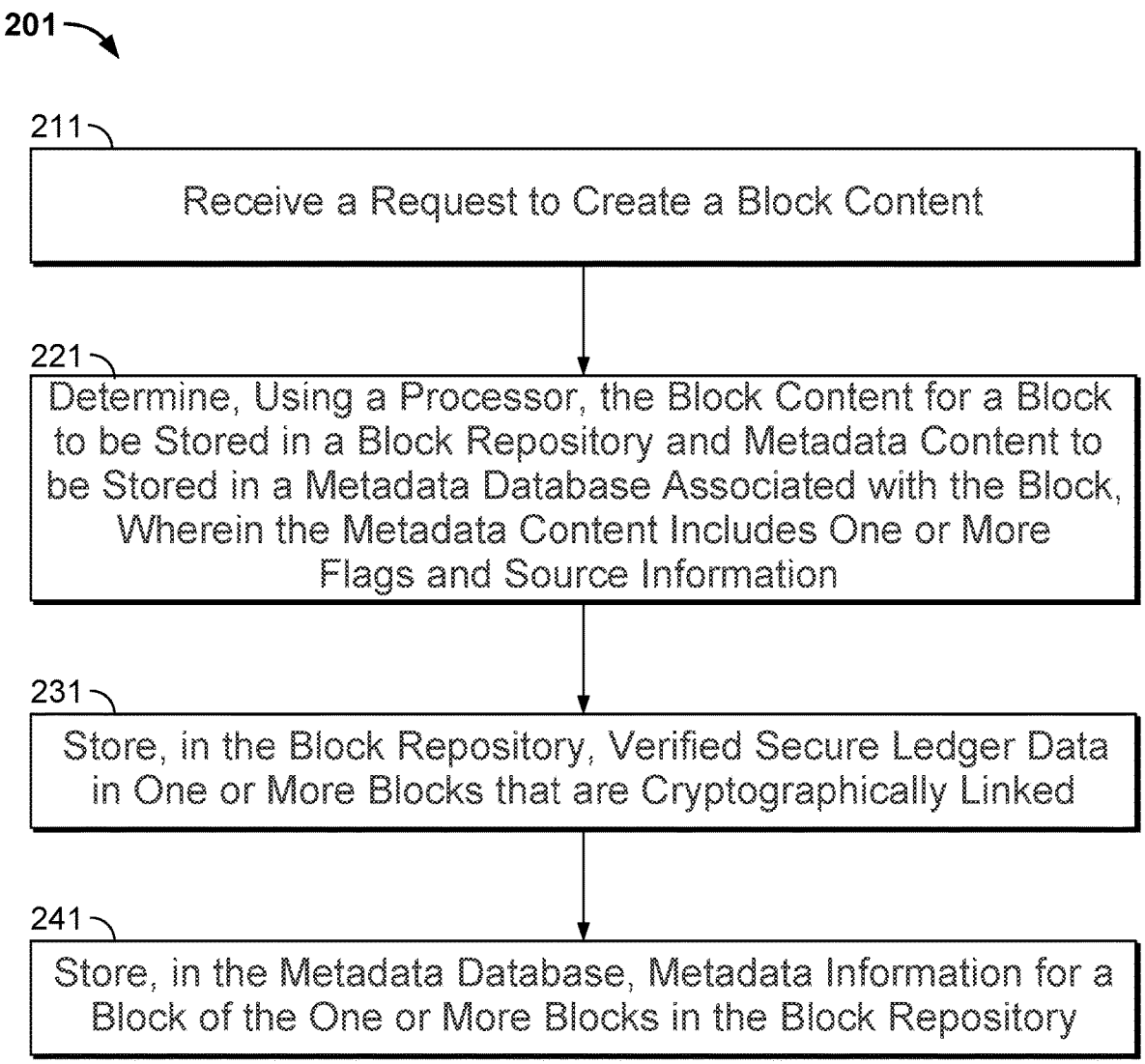
FIG. 2B is a flowchart of an exemplary method 201 for ledger generation and storage for trusted recall that can be performed by the exemplary system depicted in FIGS. 1A-1B, which includes steps of storing data or information.

FIG. 2B is a flowchart of an exemplary method 201 for ledger generation and storage for trusted recall that can be performed by the exemplary system depicted in FIGS. 1A-1B, which includes steps of storing data or information.

As shown in FIG. 2B, method 201 includes receiving a request to create a block content at 211. At 221, method 201 determines, using a processor, the block content for a block to be stored in a block repository. In some examples, the block content includes a base content, a block ID, and a previous block ID. The base content includes relevant information to generate ledger data for trusted storage and recall. For instance, in an exemplary application of the disclosed technique to generate a candidate profile to be used for employment purposes as will be described in more detail below, the base content includes candidate information relevant for profiling the candidate. The block ID and previous block ID are used in some cases to cryptographically link blocks in a blockchain or block repository.

Additionally, at 221, method 201 determines, using a processor, metadata content to be stored in a metadata database associated with the block. In some cases, the metadata content also includes a block reference ID. In some examples, the block reference ID comprises a hash. The hash can be generated using a hash function comprising an algorithm that maps data of arbitrary size to a bit string of fixed size (e.g., the hash), wherein the hash function is designed to be a one-way function that is infeasible to invert. Secure hashes are used to verify message integrity. In particular, comparing message digests (hash digests over the message) calculated before, and after, transmission can determine whether any changes have been made to the message or file. In some embodiments as will be described in more detail below, a handle (Merkel root/hash value component) associated with each block created by the system and approved by participating nodes in the blockchain (e.g., Block Repository 120 of FIG. 1A or Blockchain 170 of FIG. 1B) is stored within a database (e.g., Metadata Database 122 of FIG. 1A or application database 160 of FIG. 1B) and mapped to an identifier or ID associated with the candidate (e.g., a Candidate ID). Use of the hash thus ensures that the blocks are cryptographically linked and that information in the blocks has been cryptographically-authenticated.

In some examples, the metadata content also includes a timestamp. A timestamp can be useful, for example, to maintain a record of when certain information was obtained or added to the generated ledger data (e.g., candidate profile).

In other examples, the metadata database includes a chain metadata. In some cases, the chain metadata includes one or more of the following: a unique system ID, a chain root ID, and a forget-me flag. In these cases, the forget-me flag indicates whether a user has chosen to forget a chain associated with the block. Accordingly, the forget-me flag provides a mechanism for editing information visible to others. For instance, in the case of generating a candidate profile, a candidate might wish to remove a set of her experiences or background no longer relevant to her current career aspirations from the view of prospective employers. In this situation, the forget-me flag allows the candidate to have the system "forget" a chain (e.g., corresponding to a record of experiences the candidate does not wish to be visible to prospective employers) associated with a block.

In some cases, the metadata content includes one or more flags and source information. In some examples, the one or more flags are used to indicate whether data stored in the block has been reported as accurate or inaccurate or to indicate whether a user has given permission to share the block with others. For example, in some cases the one or more flags includes a valid flag, wherein the valid flag indicates whether data stored in the block has been reported as accurate or inaccurate. In other cases, the one or more flags include a share flag, wherein the share flag indicates whether a user has given permission to share the block. Additionally, in some examples, the method includes providing a flag display indication of the one or more flags to be displayed.

In some embodiments, the source information comprises information on who provided a base content of the block content for the block. As will be described in more detail below in an exemplary application of the disclosed technique to generate a candidate profile to be used for employment purposes, a candidate can provide personal information (e.g., the candidate's name) as a base content of the block content, an educational institution can provide accreditation information (e.g., a degree conferred to the candidate by the institution), and a corporation can provide employment information (e.g., hiring of the candidate, details of the candidate's roles and responsibilities).

In other examples, the metadata database includes a confidence metadata, wherein the confidence metadata is calculated based at least in part on a source for the block content stored in the block. For example, data regarding different sources can be used to determine how reliable the source is with respect to providing accurate information.

In some cases, the method further comprises providing the metadata content to be displayed to a user (e.g., via Display 103 of FIG. 1A).

Returning to FIG. 2B, at 231, the method includes storing, in the block repository, verified secure ledger data in one or more blocks that are cryptographically linked. In some examples, storing verified secure ledger data in one or more blocks that are cryptographically linked includes storing the block content as the block in the block repository. Moreover, as will be described in more detail below, in some cases, storing the block content as the block in the block repository includes storing the block linked to a previous block using a previous block ID. Finally, the method includes at 241 a step of storing, in the metadata database, metadata information for a block of the one or more blocks in the block repository.

In some embodiments, the method comprises reading the block content from the block repository in response to a request by a requestor. For example, in the case of reading block content from a candidate profile generated for recruiting, hiring, or employment purposes, a requestor can be the candidate seeking to view his or her own profile, an institution considering the candidate for admission, or a corporation considering the candidate for employment.

In some cases, reading the block content includes reading the metadata content associated with the block. For example, a requestor might be interested in determining the source of the candidate information (e.g., the identity of an institution or corporation) and the confidence level associated with the source. In some cases, the confidence level is derived from confidence metadata. The requestor might also be interested in viewing whether the candidate information has been reported as accurate or whether a user has given permission to share the block with others. For example, a prospective employer might want to confirm whether a candidate's degree from a particular educational institution and/or a candidate's former position at a previous employer were reported as accurate. In other cases, the candidate might want to confirm whether he or she has given permission to share the block metadata content with others.

In some cases, reading the block content includes reading or providing the block content to the requestor based at least in part on the one or more flags. For example, if a share flag indicates that a user has given permission to share the block, the block content is provided to the requestor in response to a request to read the block content. On the other hand, if the share flag indicates that a user has not given permission to share the block, the block content is not provided to the requestor in response to a request to read the block content.

In addition, in some embodiments, the method includes not reading or not providing the block content to the requestor in response to a forget-me determination that a forget-me flag is true for a block chain associated with the block. In some cases, the method includes not reading or not providing the block content to the requestor in response to a not valid determination that a valid flag is not true for the block. In other words, block content from a block determined to have information reported as inaccurate will not be read or provided to the requestor. In these cases, the requestor can select or the system can be configured to display the block content that has been reported as accurate as indicated by the valid flag for the block having the block content. In some examples, the method includes not reading or not providing the block content to the requestor in response to a not share determination that a share flag is not true for the block. In other words, block content from a block determined to have information wherein a user has indicated the information as not to be shared with others will not be read or provided to the requestor. In these cases, the requestor can select or the system can be configured to display the block content of the block wherein a share flag indicates that a user has given permission to share the block.

Figure 2C:
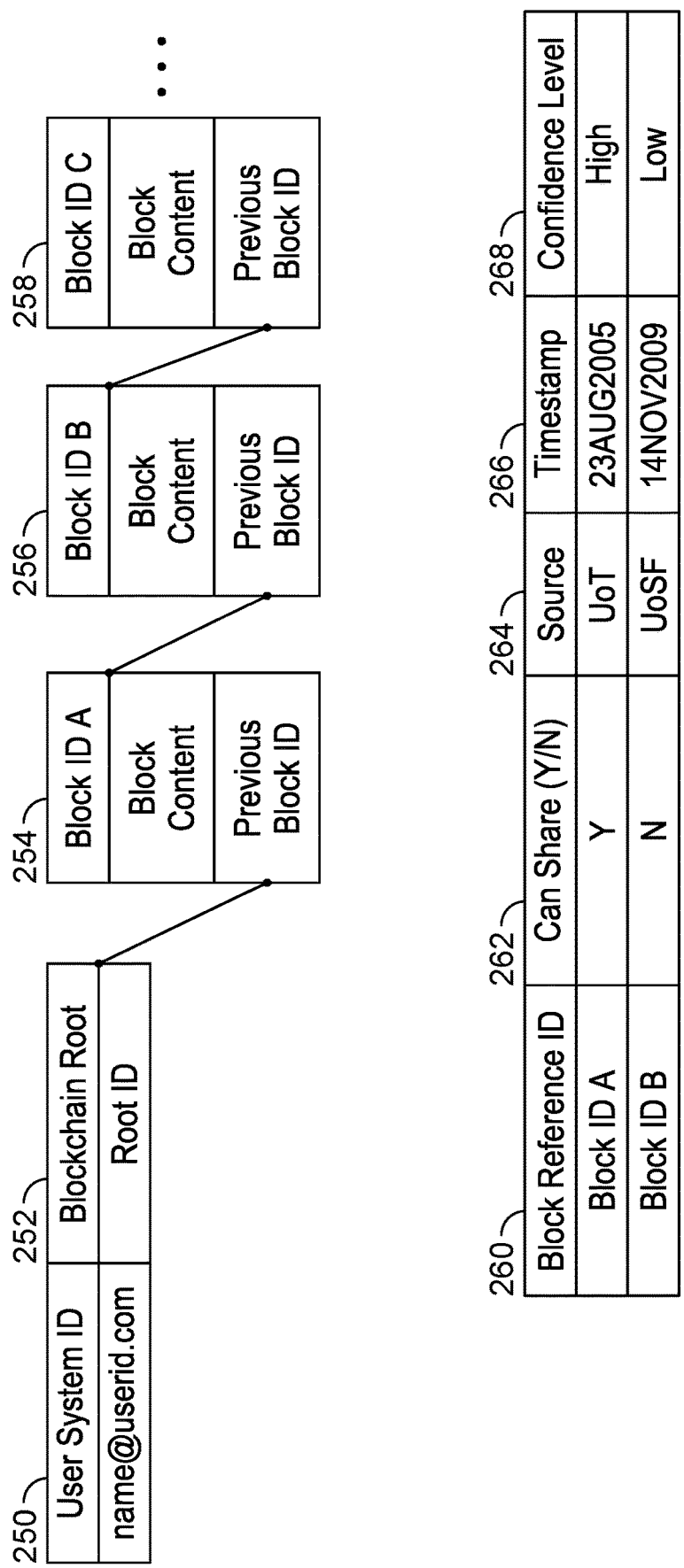
FIG. 2C is a block diagram illustrating an embodiment of a blockchain configuration.

FIG. 2C is a block diagram illustrating an embodiment of a blockchain configuration. In the example shown, a forget-me flag is not provided by the system. Instead, the system deletes and purges all user record(s) including the one which holds the user's system ID (e.g., user system ID 250 storing the user's identifier—for example, name@userid.com) as well as the blockchain root (e.g., blockchain root 252 storing root ID). For example, a request is received to mark a blockchain associated with a user's system ID for deletion or purging. At some point, the system identifies all users with associated marks to delete or purge. The system, for each user so marked, deletes the entire blockchain and deletes the blockchain root. In some embodiments, all backups for the blockchain and backups for the blockchain root.

Blocks of the blockchain (e.g., block 254, block 256, block 258, etc.) each refer to a prior block (e.g., using a block ID) and the first block refers to a blockchain root. Each block includes a block ID (e.g., block 254 includes block ID A; block 256 includes block ID B; block 258 includes block ID C; etc.). Each block also includes block content and a previous block ID. A metadata database stores information related to a blockchain block. The metadata database stores block reference ID 260; share flag 262, source information 264, timestamp 266; and confidence level 268. For example, block ID A has associated with it a share flag 'Y' (e.g., yes to sharing), a source designator 'UoT' (e.g., source of the content is University of Texas), a timestamp for when stored (e.g., 23 Aug. 2005), and a confidence level for the veracity of the information (e.g., 'High'). As another example, block ID B has associated with it a share flag 'N' (e.g., no to sharing), a source designator 'UoSF' (e.g., source of the content is University of San Francisco), a timestamp for when stored (e.g., 14 Nov. 2009), and a confidence level for the veracity of the information (e.g., 'low').

In this case, share flag 262 gives control to the user on each block of data—whether to make that one (or more) block(s) visible to an entity. The other user(s) of the system (e.g., recruiters, hiring managers, etc.) of an entity can only see what a user declares to be shareable.

In some embodiments, unique system ID (e.g., user system ID 250) refers to the unique ID assigned to each user (e.g., a candidate) whose information is being stored in our system. System ID is created and assigned upon a Create Account event. Users can log into the system using this unique ID and their password. Since there can only be one blockchain record associated to each user, the Merkel root is mapped to each user's unique system ID allowing retrieval of all of the user's blocks by traversing the chain or tree from its root ID. Without the Merkel root, the system cannot retrieve the user's blockchain records.

In some embodiments, confidence level (e.g., confidence level 268) stores a variable scale to reflect confidence indicative of how trusted and verified the content of the block is deemed. Several factors are considered in assigning a confidence level—for example, a source of the information (e.g., the information comes straight from the source that is responsible for initiating the content such as a university awarding a degree, a company hiring, an authoritative source, a third party, a background provider, self-reported information, etc.), a trust level of the source (e.g., is the information coming from an accredited source or from a non-accredited source), a report of inaccuracy (e.g., whether there was ever a user or system initiated inaccuracy reported for the block), or directed or derived data (e.g., whether the information is derived from a set of blocks or read straight from the block), etc.

In some embodiments, source designator (e.g., source information 264) can be from a primary party or primary source such as a university awarding a degree, a company hiring from the candidate, an institution granting a license. In some embodiments, source designator (e.g., source information 264) can be from a third party source such parties (e.g., a background check provider) who did not participate in the transaction or event, but rather the source gathered evidence after the fact about the transaction and its details or was a witness thereof.

Figure 2D:
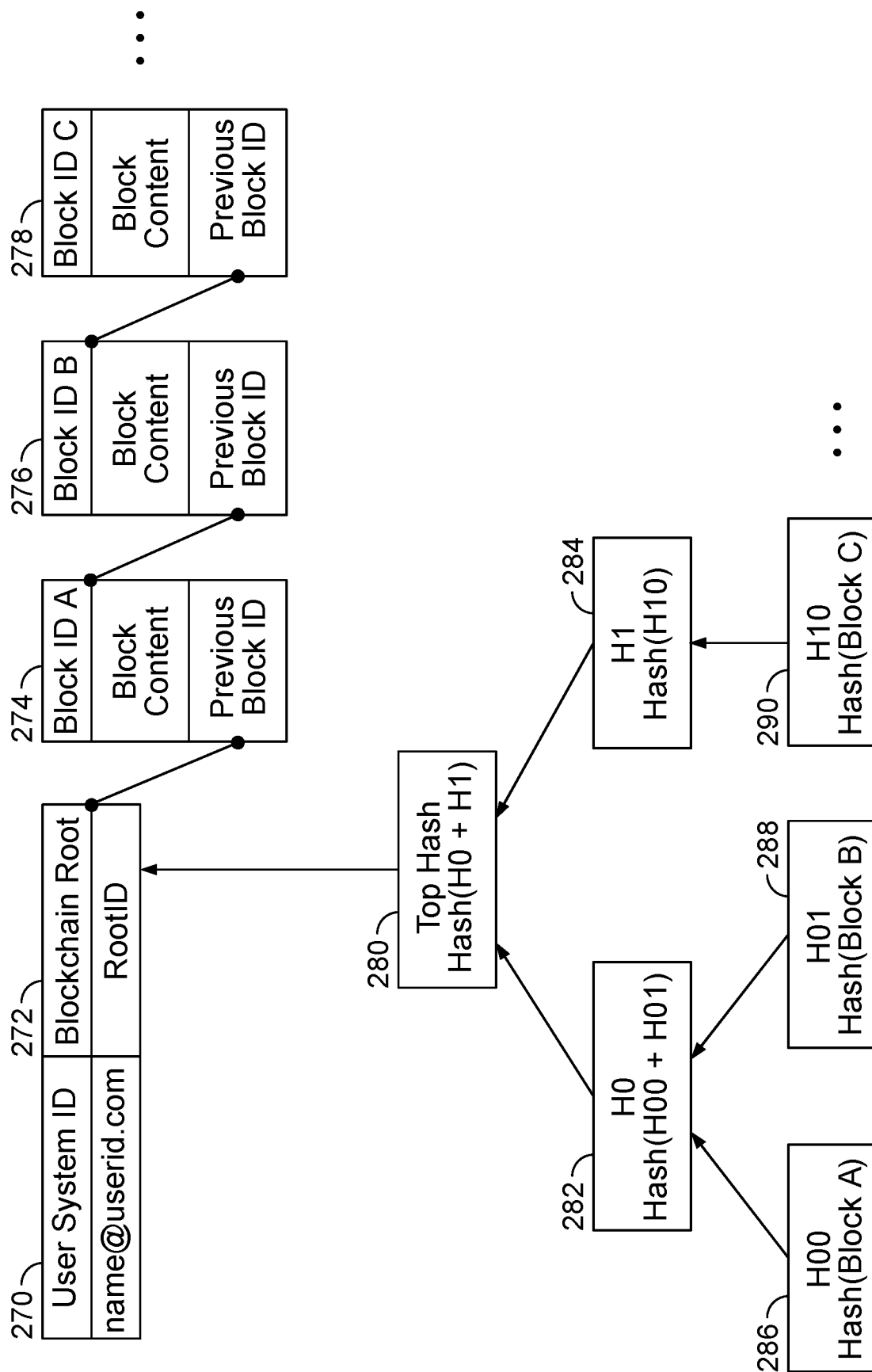
FIG. 2D is a block diagram illustrating an embodiment of a blockchain configuration.

FIG. 2D is a block diagram illustrating an embodiment of a blockchain configuration. In the example shown, a forget-me flag is not provided by the system. Instead, the system deletes and purges all user record(s) including the one which holds the user's system ID (e.g., user system ID 270 storing the user's identifier—for example, name@userid.com) as well as the blockchain root (e.g., blockchain root 272 storing root ID). Blocks of the blockchain (e.g., block 274, block 276, block 278, etc.) each refer to a prior block (e.g., using a block ID) and the first block refers to a blockchain root. Each block includes a block ID (e.g., block 274 includes block ID A; block 276 includes block ID B; block 278 includes block ID C; etc.). Each block also includes block content and a previous block ID. Top hash 280 is associated with blockchain root 272. Top hash is also known as a chain root or a Merkel root. In cryptography, top hash 280 is or Merkel root refers to the hash calculated for the top (or first) node in the chain (or tree). Ever block has a hash associated with it. The hash for each block is calculated by hashing the codes for all its children. For example, H0 282 is a hash of H00 286 and H01 288, where H00 286 is hash for block A (e.g., the contents of block A, the entire block A, the identifier of Block A), and where H01 is hash for block B (e.g., the contents of block B, the entire block B, the identifier of Block B). Similarly, H1 284 is a hash of H10 290 of hash for block C (e.g., the contents of block C, the entire block C, the identifier of Block C). In other words, the Merkel root is the hash of all the hashes of all the blocks. The Merkel root is part of the block header. With this scheme, it is possible to securely verify that a transaction has been accepted by the network and get the number of confirmations by downloading just the small block headers and Merkel tree—downloading the entire blockchain is unnecessary.

The exemplary embodiments described above and as shown in FIGS. 1A-1B and 2A-2D provide for the storage, retrieval, and display of true and verified ledger data. In an exemplary application where the disclosed technique is used to generate a candidate profile, the ledger data includes candidate information that companies can use for recruiting or hiring purposes, or for their own internal needs.

As described in the following figures and examples, the disclosed system stores and/or writes candidate profile related fields, including but not limited to education, skills, licenses, work history, criminal records, credit history, bankruptcies, division of motor vehicle (DMV) records, and other candidate information in a block repository or blockchain-based storage. Sources for candidate information include: educational institutions awarding a degree, diploma, certificate or license of a candidate; corporations hiring, promoting, or changing a job profile of a candidate/employee; and background checks received from third parties. An example of how candidate information is generated and stored for trusted recall using the disclosed technique is shown and described with respect to FIGS. 3A-3B.

Figure 3A:
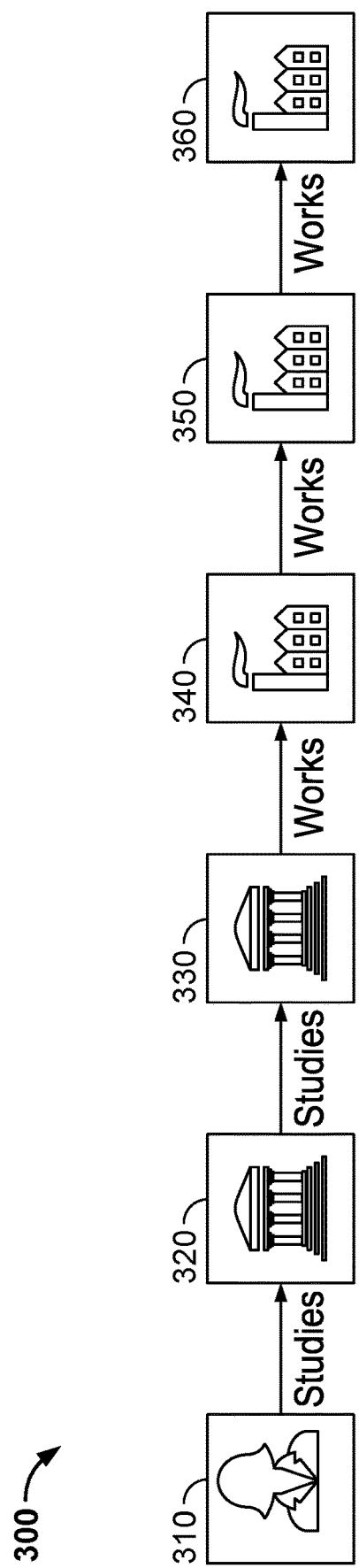
FIG. 3A is a block diagram 300 depicting an example of a candidate's progression through a succession of life events, through which the candidate might acquire a certain set of skills, experiences, and background relevant to profiling the candidate using the disclosed technique.

FIG. 3A is a block diagram 300 depicting an example of a candidate's progression through a succession of life events, through which the candidate might acquire a certain set of skills, experiences, and background relevant to profiling the candidate using the disclosed technique. A candidate profile is useful to employers for recruiting and hiring purposes and to the candidate for purposes of seeking employment.

In the example shown, Candidate 310 embarks on her studies at a first institution, shown as Undergraduate Educational Institution 320 (e.g., to earn an undergraduate degree). Upon completing her studies at Undergraduate Educational Institution 320, Candidate 310 proceeds to a second institution for further studies, shown here as Graduate Educational Institution 330 (e.g., to earn a graduate degree). After completing her studies at Graduate Educational Institution 330, Candidate 310 starts employment at a first corporation (e.g., First Corporation 340), where Candidate 310 acquires certain experience and skills. Candidate 310 leaves First Corporation 340 to work at a second corporation (e.g., Second Corporation 350), where she works for some amount of time, acquiring further experience and skills. Thereafter, Candidate 310 leaves Second Corporation 350 to work at a third corporation (e.g., Third Corporation 360), where Candidate 310 is currently employed.

Figure 3B:
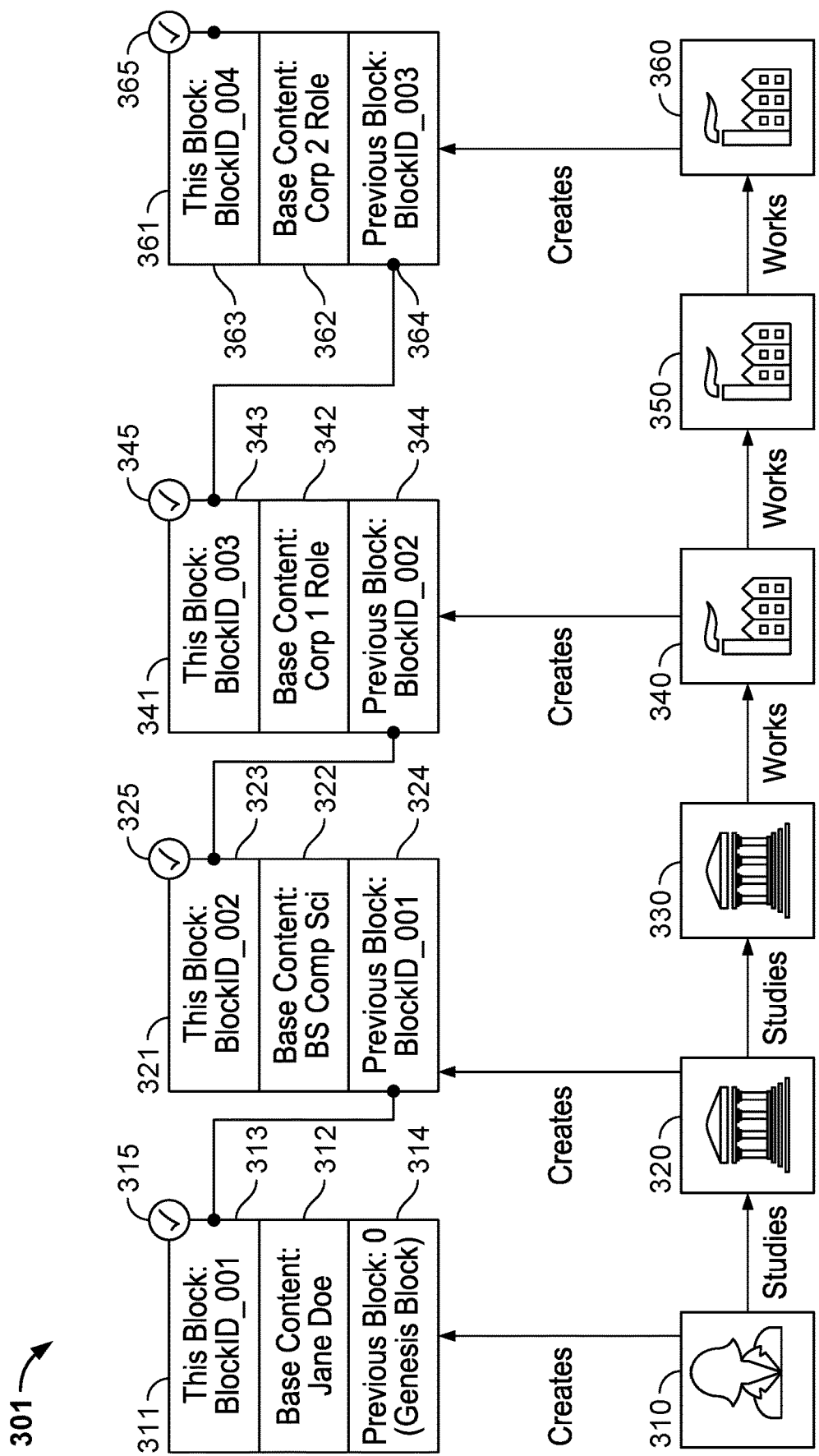
FIG. 3B is a block diagram 301 depicting the candidate's progression through the succession of life events as shown in FIG. 3A, including how candidate information or ledger data associated with the candidate is stored (e.g., in a candidate profile) in one or more blocks that are cryptographically linked for trusted storage and recall.

FIG. 3B is a block diagram 301 depicting the candidate's progression through the succession of life events as shown in FIG. 3A, including how candidate information or ledger data associated with the candidate is stored (e.g., in a candidate profile) in one or more blocks that are cryptographically linked for trusted storage and recall. In this example, the system (e.g., systems 100 or 101 of FIGS. 1A-1B) is configured to capture the candidate's life events and relevant experiences and to store data related to the life events and relevant experiences cryptographically in an encrypted identity store or blockchain (e.g., Block Repository 120 of FIG. 1A or Blockchain 170 of FIG. 1B).

In some cases, a mechanism for capturing candidate information based on the candidate's life events includes receiving an indication at the completion of certain life events. For example, an indication such as "Receive Educational Accreditation," is received upon completion of an educational program at an educational institution (e.g., Undergraduate Educational Institution 320 and Graduate Educational Institution 330). Other examples of indications include: "Acquire Skills," where a candidate works in a particular position or in a particular role and acquires certain skills in that position or role, "Hire Candidate," for instance, when a candidate is hired for a position or a role, or "Change Job" when a candidate changes jobs. In response to a received indication, the system initiates or triggers a process of storing candidate information in one or more blocks that are cryptographically linked to generate a candidate profile (e.g., a Cryptographically Verified Professional Profile).

As shown in FIG. 3B, in response to a request to create a block content, if a candidate profile does not yet exist for a candidate (e.g., Candidate 310), the system determines the block content for a block to be stored in a block repository (e.g., Block Repository 120 of FIG. 1A or Blockchain 170 of FIG. 1B). The block content includes a base content, a block ID, and a previous block ID. The base content includes relevant information to generate ledger data for trusted storage and recall. In this case, the base content includes candidate information relevant for profiling the candidate. The block ID and previous block ID are used in some cases to cryptographically link blocks in a blockchain or block repository.

In addition to determining the block content for a block to be stored, the system also determines metadata content to be stored in a metadata database (e.g., Metadata Database 122 of FIG. 1A or application database 160 of FIG. 1B) associated with the block. In some cases, the metadata content also includes a block reference ID. In some examples, the block reference ID comprises a hash as described previously with respect to FIG. 2B.

In some examples, the metadata content also includes a timestamp. A timestamp can be useful, for example, to maintain a record of when certain information was obtained or added to the generated ledger data (e.g., candidate profile).

In other examples, the metadata database includes a chain metadata. In some cases, the chain metadata includes one or more of the following: a unique system ID, a chain root ID, and a forget-me flag. In these cases, as described previously with respect to FIG. 2B, the forget-me flag indicates whether a user has chosen to forget a chain associated with the block.

In some cases, the metadata content includes one or more flags and source information. In some examples, the one or more flags are used to indicate whether data stored in the block has been reported as accurate or inaccurate or to indicate whether a user has given permission to share the block with others. For example, in some cases the one or more flags includes a valid flag, wherein the valid flag indicates whether data stored in the block has been reported as accurate or inaccurate. In other cases, the one or more flags includes a share flag, wherein the share flag indicates whether a user has given permission to share the block. Additionally, in some examples, the system is configured to display an indication of the one or more flags.

In some embodiments, the source information comprises information on the person or entity that provided a base content of the block content for the block. For example, as described below, a candidate can provide personal information (e.g., the candidate's name) as a base content of the block content, an educational institution can provide accreditation information (e.g., a degree conferred to the candidate by the institution), a background check provider can provide background check information on the candidate, and a corporation can provide employment information (e.g., hiring of the candidate, details of the candidate's roles and responsibilities, etc.).

In other examples, the metadata database includes a confidence metadata, wherein the confidence metadata is calculated based at least in part on a source for the block content stored in the block. For example, data regarding different sources can be used to determine how reliable the source is with respect to providing accurate information. In some cases, the system is configured to display the metadata content such as a confidence level derived from the confidence metadata to a user (e.g., via Display 103 of FIG. 1A).

In some examples, a request to create a block content is provided by the candidate, in this case, Candidate 310. In some cases, the candidate provides the request using an input interface on a candidate system as will be described more fully below.

In the example shown in FIG. 3B, Genesis Block 311 is created in response to the request received from Candidate 310. Genesis Block 311 has a block content that includes base content 312, block ID 313, and previous block ID 314. Here, base content 312 includes personal information about the candidate, such as the candidate's name (e.g., Jane Doe), and block ID 313 is BlockID_001. Since this is the first block or genesis block associated with Candidate 310, previous block ID 314 in this case has a value of 0.

In some cases, a block in a candidate profile is verified and its contents certified as true. For example, Genesis Block 311 is cryptographically-authenticated (e.g., by confirming that the candidate's personal information is valid), as shown by a valid flag (e.g., in Display 103 of FIG. 1A), which in this case, is an icon of checkmark 315. Note that the checkmark icon is but an example of a valid flag and that other flags or indicators can be used to indicate that the data in a particular block is valid, accurate, true and/or verified candidate information without limiting the scope of the disclosed technique.

Additionally, a confidence level calculated based at least in part on a source for the block content stored in the block is stored in the metadata database. In some cases, the confidence level is expressed in terms of a percentage of confidence for trusted verified information. For instance, a confidence level of 100% is assigned to information coming directly from educational institutions, corporations, or a source entity (e.g., a third party providing a background check), while information (such as s skill) that is derived from data retrieved from the block repository or blockchain-based storage is designated a confidence level anywhere between 0 to 100%.

In some embodiments, a blockchain handle (Merkel root/ hash value component) associated with Genesis Block 311 is stored within a database (e.g., Metadata Database 122 of FIG. 1A or application database 160 of FIG. 1B) and mapped to an identifier or ID associated with the candidate (e.g., a Candidate ID). If the candidate profile already exists, then the handle associated with the genesis block for the candidate is retrieved from the database for further processing.

As the candidate progresses through the succession of life events as shown in FIG. 3A, the system receives an indication of the completion of certain life events as described above. In some cases, the indication is received by a participating node in a private/permissioned network. Participating nodes include institutions, companies, or other entities that publish candidate information (e.g., education, hiring, promotion, and other candidate information) on their own databases as well as on a private cryptographically encrypted data repository (e.g., Block Repository 120 of FIG. 1A or Blockchain 170 of FIG. 1B) with a valid and signed certificate.

In the example shown in FIG. 3B, Candidate 310 embarks on her studies at a first institution, shown as Undergraduate Educational Institution 320 (e.g., to earn an undergraduate degree). Here, Undergraduate Education Institution 320 provides an indication such as "Receive Educational Accreditation," indicating Jane Doe's completion of an undergraduate degree from Undergraduate Education Institution 320.

In some cases, the indication includes a request received by the system to create a block content and to determine the block content for the block to be stored in a block repository (e.g., Block Repository 120 of FIG. 1A or Blockchain of FIG. 1B) and metadata content to be stored in a metadata database (e.g., Metadata Database 122 of FIG. 1A or application database 160 of FIG. 1B) associated with the block. In this case, in response to the indication received from Undergraduate Education Institution 320 regarding Jane Doe's completion of an undergraduate degree, a new block of data is created (e.g., newly-created block 321) that includes relevant candidate information received from Undergraduate Education Institution 320.

As shown in FIG. 3B, newly-created block 321 has a block content that includes base content 322, block ID 323, and previous block ID 324. In this example, base content 322 includes educational information about the candidate, such as the candidate's undergraduate degree (e.g., Bachelor of Science in Computer Science), and block ID 323 is BlockID_002. Since the creation of block 321 immediately follows the creation of genesis block 311 in the series of blocks comprising the candidate profile for this particular candidate, Jane Doe, previous block ID 324 is BlockID_001, which is the block ID for genesis block 311.

At this point, newly-created block 321 is broadcasted to every participating node in a private/permissioned network. Participating nodes in the blockchain (e.g., Block Repository 120 of FIG. 1A or Blockchain 170 of FIG. 1B) have an opportunity to approve each newly-created block and the newly-created block's content. After approval, the newly-created block is then added to the private/permissioned network, providing an irreversible and immutable record of the transaction (e.g., the transaction that created the block and its contents). In some cases, the newly-created block is marked with a special tag that represents that it is part of the candidate's profile. In some instances, this tag is used for faster search and retrieval at a later point in time.

Note that the disclosed technique allows participating nodes (e.g., institutions, companies, and other participating entities) to publish candidate information (e.g., education, hiring, promotion, and other candidate information) on their own database in their own system as well as on a private cryptographically encrypted data repository (e.g., Block Repository 120 of FIG. 1A or Blockchain 170 of FIG. 1B) with a valid and signed certificate. Cryptographically-authenticated information (as provided by the irreversible and immutable record of the transaction of adding the newly-created block approved by participating nodes in the blockchain) is indicated for newly created block 321 by a valid flag (e.g., on Display 103 of FIG. 1A), which in this case, is an icon of checkmark 325. Note that the checkmark icon is but an example of a valid flag and that other flags or indicators can be used to indicate that the data in a particular block is valid, accurate, true and/or verified candidate information without limiting the scope of the disclosed technique.

Returning to FIG. 3B and continuing along this particular candidate's progression through the succession of life events, upon completing her studies at Undergraduate Educational Institution 320, Jane Doe proceeds to a second institution for further studies, shown here as Graduate Educational Institution 330 (e.g., to earn a graduate degree). But unlike Undergraduate Educational Institution 320, which provided an indication such as "Receive Educational Accreditation," received by the system, in this case, Graduate Educational Institution 330 provides no such indication. As a result, although Jane Doe completes a course of study and receives a Master of Science degree in Computer Science from Graduate Educational Institution 330, no request is received by the system and no block is created to capture relevant data from Graduate Educational Institution 330 regarding Jane Doe. Consequently, Jane Doe's completion of a Master of Science degree in Computer Science from Graduate Educational Institution 330 is unverified information that is not cryptographically authenticated by the blockchain (e.g., Block Repository 120 of FIG. 1A or Blockchain of FIG. 1B).

Returning again to FIG. 3B and continuing along Jane Doe's progression through the succession of life events, after completing her studies at Graduate Educational Institution 330, Jane Doe starts employment at a first corporation (e.g., First Corporation 340), where she acquires certain experience and skills.

In the example shown, First Corporation 340 provides an indication such as "Hire Candidate" and/or "Acquire Skills," which in this case are indicative of Jane Doe's employment at First Corporation 340 in a particular role having certain responsibilities.

In some cases as described previously, the indication includes a request received by the system to create a block content and to determine the block content for the block to be stored in a block repository (e.g., Block Repository 120 of FIG. 1A or Blockchain of FIG. 1B) and metadata content to be stored in a metadata database (e.g., Metadata Database 122 of FIG. 1A or application database 160 of FIG. 1B) associated with the block. Here, in response to the indication received from First Corporation 340 regarding Jane Doe's employment at First Corporation 340 in a particular role having certain responsibilities, a new block of data is created at 341 that includes relevant candidate information received from First Corporation 340.

As shown in FIG. 3B, second newly-created block 341 has a block content that includes base content 342, block ID 343, and previous block ID 344. Base content 342 includes employment information about the candidate, such as the candidate's role and responsibilities at First Corporation 340. In this case, block ID 343 is BlockID_003. Since the creation of block 341 immediately follows the creation of block 321 in the series of blocks comprising the candidate profile for this particular candidate, previous block ID 344 is BlockID_002, which is the block ID for block 321.

At this point, the most recently created block at second newly-created block 341 is broadcasted to every participating node in a private/permissioned network. Participating nodes in the Blockchain (e.g., Block Repository 120 of FIG. 1A or Blockchain 170 of FIG. 1B) have an opportunity to approve each broadcasted block and the block's content. Each approved block is then added to the private/permissioned network, providing an irreversible and immutable record of the transaction (e.g., the transaction that created the block and its contents). In some cases, the approved block is marked with a special tag that represents that it is part of the candidate's profile. In some instances, this tag is used for faster search and retrieval at a later point in time.

Returning to FIG. 3B, after working at First Corporation 340, Jane Doe changes jobs, leaving First Corporation 340 to work at a second corporation (e.g., Second Corporation 350), where she works for some amount of time, acquiring further experience and skills. But unlike First Corporation 340, which provided an indication such as "Hire Candidate" and/or "Acquire Skills," received by the system, in this case, Jane Doe's second place of employment, Second Corporation 350 provides no such indication. As a result, although Jane Doe is employed at Second Corporation 350 in a role with responsibilities, no request is received by the system and no block is created to capture relevant data from Second Corporation 350 regarding Jane Doe's employment. Consequently, Jane Doe's employment at Second Corporation 350 is unverified information that is not cryptographically authenticated by the blockchain (e.g., Block Repository 120 of FIG. 1A or Blockchain 170 of FIG. 1B).

Returning again to FIG. 3B and continuing along Jane Doe's progression through the succession of life events, Jane Doe changes jobs a second time, leaving Second Corporation 350 to work at a third corporation (e.g., Third Corporation 360), where she works for some amount of time, acquiring further experience and skills.

However, in this case, unlike Second Corporation 350, Third Corporation 360 provides an indication such as "Hire Candidate," and/or "Acquire Skills," which are indicative of Jane Doe's employment at Third Corporation 360 in a particular role having certain responsibilities.

As described previously, the indication provided by Third Corporation, at least in this case, includes a request received by the system to create a block content and to determine the block content for the block to be stored in a block repository (e.g., Block Repository 120 of FIG. 1A or Blockchain 170 of FIG. 1B) and metadata content to be stored in a metadata database (e.g., Metadata Database 122 of FIG. 1A or application database 160 of FIG. 1B) associated with the block. In particular, in response to the indication received from Third Corporation 360 regarding Jane Doe's employment at Third Corporation 360 in a particular role having certain responsibilities, a new block of data is created at third newly-created block 361 that includes relevant candidate information received from Third Corporation 360.

As shown in FIG. 3B, the most recently created block (third newly-created block 361) has a block content that includes base content 362, block ID 363, and previous block ID 364. Base content 362 includes employment information about the candidate, such as the candidate's role and responsibilities at Third Corporation 360. In this case, block ID 363 is BlockID_004. Since the creation of the block at third newly-created block 361 immediately follows the creation of the block at second newly-created block 341 in the series of blocks comprising the candidate profile for this particular candidate, previous block ID 364 is BlockID_003, which is the block ID for the block (third newly-created block 341).

At this point, the most recently created block (third newly-created block 361) is broadcasted to every participating node in a private/permissioned network or blockchain. Participating nodes in the blockchain-based data storage (e.g., Block Repository 120 of FIG. 1A or Blockchain 170 of FIG. 1B) have an opportunity to approve each broadcasted block and the block's content. Each approved block is then added to the private/permissioned network, providing an irreversible and immutable record of the transaction (e.g., the transaction that created the block and its contents). In some cases, the approved block is marked with a special tag that represents that it is part of the candidate's profile. In some instances, this tag is used for faster search and retrieval at a later point in time.

Additionally, in some embodiments, a handle (Merkel root/hash value component) associated with each block created by the system and approved by participating nodes in the private/permissioned network or blockchain (e.g., Block Repository 120 of FIG. 1A or Blockchain 170 of FIG. 1B) is stored within a database (e.g., (e.g., Metadata Database 122 of FIG. 1A or application database 160 of FIG. 1B) and mapped to an identifier or ID associated with the candidate (e.g., a Candidate ID). If the candidate profile already exists, then the handle associated with the most recently created block for the candidate is retrieved from the database for further processing.

In some examples, the system (e.g., CPU 102 of FIG. 1A or Processor 151 of FIG. 1B) is further configured to store the block content of each block in the candidate profile as the block in the block repository. In other examples, the block is stored linked to a previous block as described above using a previous block ID. This continuous process as described above of capturing and storing a candidate's life events over time creates a trusted and verified professional profile for the candidate stored in a block repository (as verified secure ledger data in one or more blocks that are cryptographically linked) and in a metadata database (as metadata information for a block of the one or more blocks in the block repository).

In some embodiments, the system is configured to capture additional data (e.g., background check data) associated with a candidate and store the additional data in the candidate profile. In particular, the system is configured to receive background check data upon completion and retrieval of a background check from a third party. In this case, the system receives an indication of completion of a background check for the candidate from the third party. In response to the indication of completion of a background check, the system parses the background check data received from the third party (e.g., a background check provider or entity) and begins the process of storing the background check data as block content in the candidate profile.

In particular, a new block of data is created for every background check component including but not limited to education, skills, work history, DMV, bankruptcies, credit history, criminal records, and other background check data obtained via a background check on the candidate. Each block created for each background component is then stored and linked to an ID corresponding to or associated with the candidate (e.g., the candidate ID).

In some embodiments, the system is configured to receive an indication to check data in a block and to mark the block as being verified in the metadata information associated with the block. In particular, the system is configured with a mechanism that addresses incorrect data previously stored in an initial block by creating a new block and marking the new block as verified and marking the initial block having the incorrect data as unverified. An embodiment of this mechanism is further described with respect to the following figures.

Figure 4A:
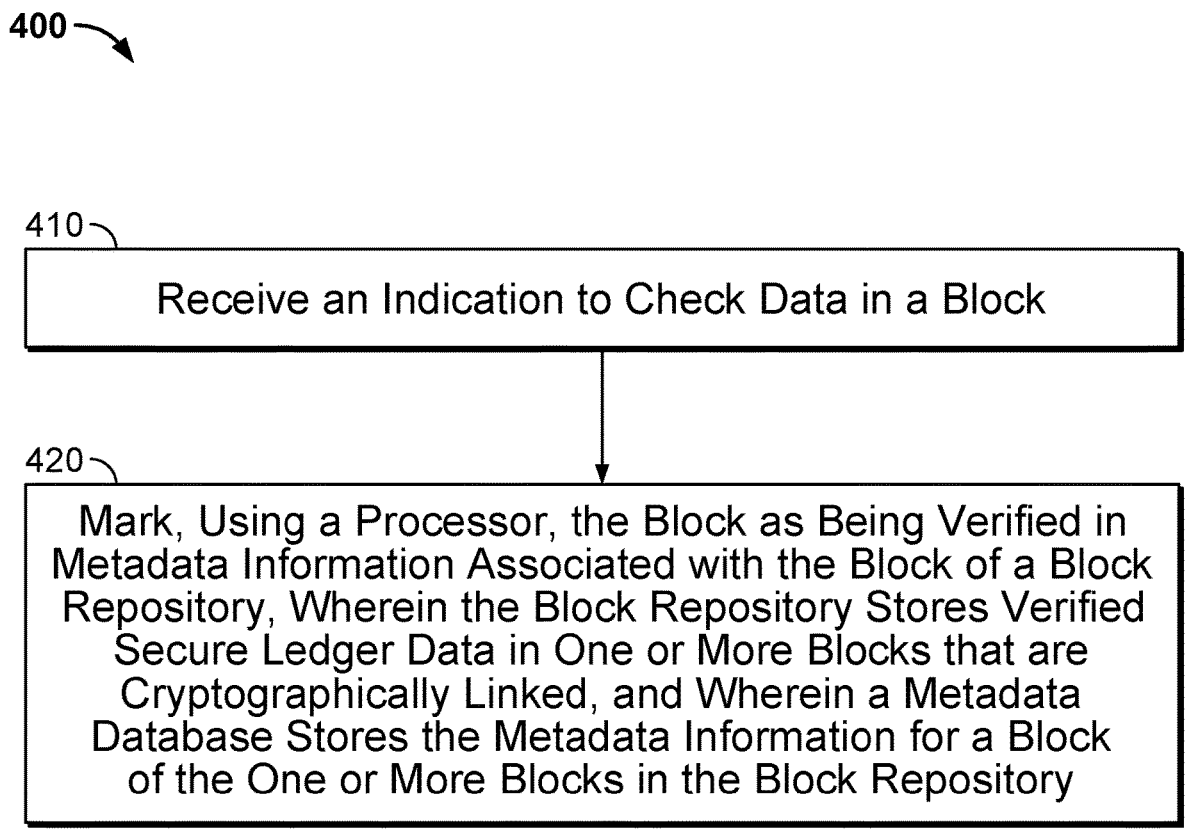
FIG. 4A is a flowchart of an exemplary method 400 for ledger generation and storage for trusted recall that can be performed by exemplary systems depicted in FIGS. 1A-1B that includes receiving an indication to check data and marking verified information.

FIG. 4A is a flowchart of an exemplary method 400 for ledger generation and storage for trusted recall that can be performed by exemplary systems depicted in FIGS. 1A-1B that includes receiving an indication to check data and marking verified information. As shown in FIG. 4A, the method 400 includes receiving an indication to check data in a block at 410. In some cases, the indication is provided by a user seeking to correct or update information previously stored in the block repository or blockchain.

At 420, the method includes a step of marking, using a processor, the block as being verified in metadata information associated with the block of a block repository, wherein the block repository stores verified secure ledger data in one or more blocks that are cryptographically linked, and wherein a metadata database stores the metadata information for a block of the one or more blocks in the block repository.

In some cases, for example in the case where a user seeks to correct or update information previously stored in the block repository or blockchain, the indication to check data comprises an incorrect data indication. The incorrect data indication indicates previously stored data in a block is incorrect. Additionally, the indication to check data comprises verified information. In these cases, the verified information is the correct information a user seeks to add to the block repository (to update information previously stored and now inaccurate). In some embodiments although not shown in FIG. 4A, the method also includes storing the verified information. Moreover, in some examples, the indication to check data comprises a third party data source indication. The third party source indication includes information regarding the source of the new data to be stored in a new block.

Figure 4B:
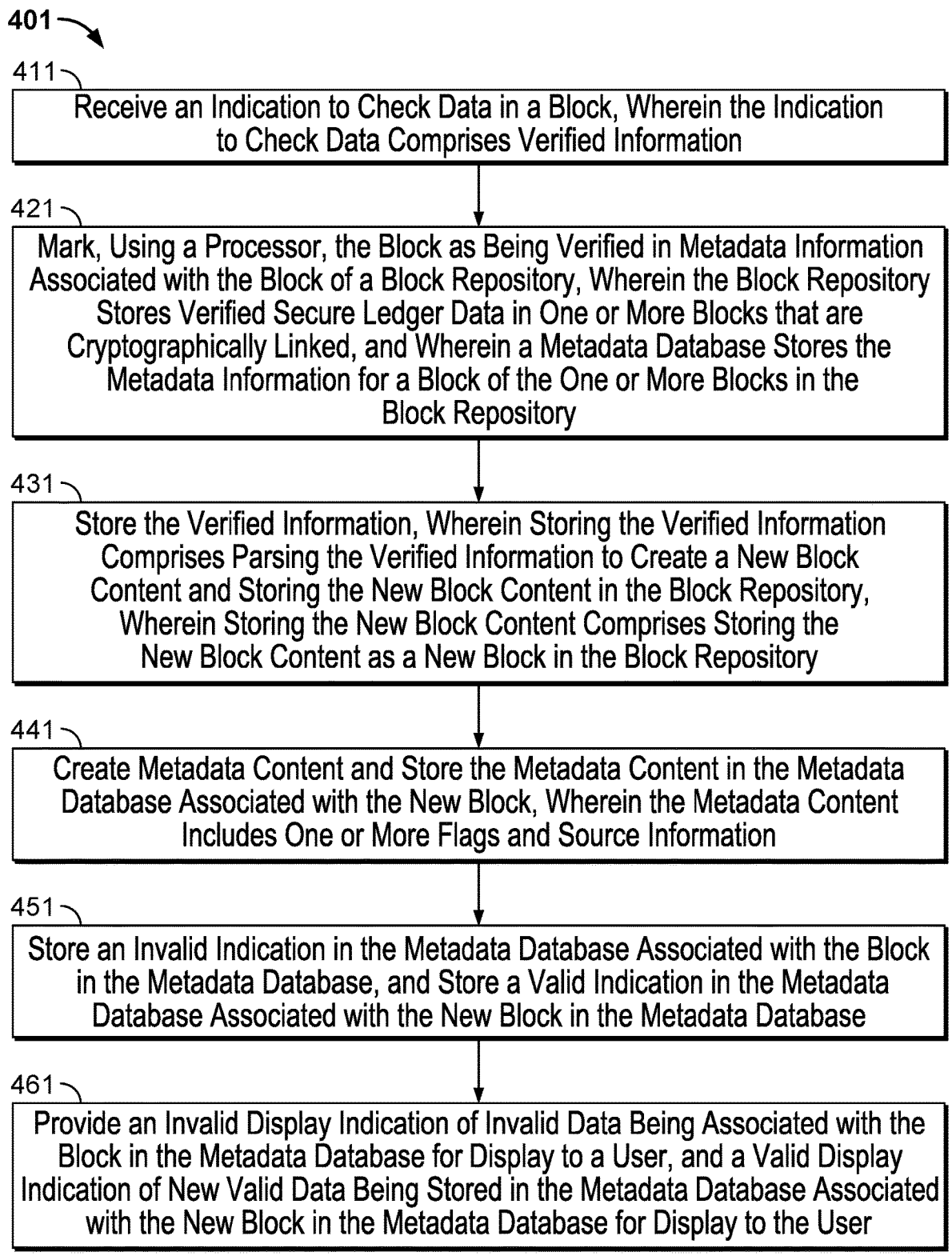
FIG. 4B is a flowchart of an exemplary method 401 for ledger generation and storage for trusted recall that includes additional steps for marking verified information.

FIG. 4B is a flowchart of an exemplary method 401 for ledger generation and storage for trusted recall that includes additional steps for marking verified information. As shown in FIG. 4B, the method 401 includes receiving an indication to check data in a block at 411, wherein the indication to check data comprises verified information. As noted above, the verified information is the correct information a user seeks to add to the block repository (to update information previously stored and now inaccurate). The method 401 also includes marking, using a processor, the block as being verified in metadata information associated with the block of a block repository at 421. As in the previous example, the block repository stores verified secure ledger data in one or more blocks that are cryptographically linked, and a metadata database stores the metadata information for a block of the one or more blocks in the block repository.

At 431, the method 401 includes storing the verified information in the metadata database. In the example shown, storing the verified information comprises parsing the verified information to create a new block content and storing the new block content in the block repository. In some cases, as shown in FIG. 4B, storing the new block content comprises storing the new block content as a new block in the block repository.

At 441, the method 401 includes creating metadata content and storing the metadata content in the metadata database associated with the new block, wherein the metadata content includes one or more flags and source information. In some examples, the one or more flags are used to indicate whether data stored in the block has been reported as accurate or inaccurate or to indicate whether a user has given permission to share the block with others. For example, in some cases the one or more flags include a valid flag, wherein the valid flag indicates whether data stored in the block has been reported as accurate or inaccurate. In other cases, the one or more flags include a share flag, wherein the share flag indicates whether a user has given permission to share the block. Additionally, in some examples, the method includes providing a flag display indication of the one or more flags to be displayed and in some cases, the source information comprises information on who provided a base content of the block content for the block.

In some cases, the metadata content also includes a block reference ID. In some examples, the block reference ID comprises a hash.

In some examples, the metadata content also includes a timestamp. A timestamp can be useful, for example, to maintain a record of when certain information was obtained or added to the generated ledger data (e.g., candidate profile).

At 451, the method 401 includes storing an invalid indication in the metadata database associated with the block in the metadata database, and storing a valid indication in the metadata database associated with the new block in the metadata database. Here, the invalid indication labels or is associated with incorrect data previously stored in an initial block while the valid indication labels or is associated with the new block. In this manner, the new block is marked as verified and the block having the incorrect data is marked as unverified.

At 461, the method 401 includes providing an invalid display indication of invalid data being associated with the block in the metadata database for display to a user, and a valid display indication of new valid data being stored in the metadata database associated with the new block in the metadata database for display to the user.

Although not shown in FIGS. 4A-4B, in some cases, a method for ledger generation and storage for trusted recall that includes steps for receiving an indication to check data and marking verified information also includes providing a verification indication that data is being verified. In some examples, the method further includes storing a confidence level in the metadata database based at least in part on a source of the new block content. Additionally, as described with respect to examples of a display as will be provided below, in some cases, the method also includes providing a confidence indication of the confidence level for display to a user.

In some embodiments, to prevent potentially compromised data from entering the system from $3^{rd}$ parties, the system includes a flag for data verification, a retrieval mechanism for revised information, a confidence level marking. For example, the flag for data verification is added to data in the event that the data is received from a non-accredited provider. The data flagged for verification is not added as information in blocks on a user's blockchain until after a verification of the data is performed. An appropriate level of confidence is marked associated with each data element based at least in part on the creator of the data block, the source of the data, and whether the data is derived or directly sourced. In addition, any data that is not verified is either entered in the blockchain as very low confidence data or not entered at all.

In some embodiments, internal accidental or intentional creation or updating of blocks is controlled using security controls that are enforced during the creation or updating of blocks for a user's blockchain. In addition, the security controls are used for authentication and authorization, for data segregation, data encryption at storage (e.g., database security), encryption of data in transit (e.g., network security), data backups, and application level audits.

In some embodiments, the system application enforces group policy-based security for authorization. The application prevents customer end users from directly accessing the production database. Security groups combined with pre-defined security-policies grant or restrict user access to functionality, business processes, reports and data. Customer-configurable security groups are based on users, roles, jobs, organizations, or business sites, and can be combined into new security groups that logically include and exclude other groups. System-to-system access is defined by integration system security groups. This Contextual Security model limits visibility of application capabilities to only authorized users. Cryptographically Verified Professional Profile ensures that the right users with right roles & authorizations are allowed to make changes to a given professional profile. Additionally, any changes to professional profile initiated internally within the system would be required to be endorsed by a user's manager before being committed to the blockchain based on tenanted preferences.

In some embodiments, multi-tenancy is a key feature of the system that enables multiple customers to share one physical instance of the system while isolating each customer tenant's application data. The system accomplishes this through an Object Management Server (OMS). Every user ID is associated with exactly one tenant, which is then used to access the system application. All instances of application objects (such as Organization, Worker, etc.) are tenant-based, so every time a new object is created, that object is also irrevocably linked to the user's tenant. The system maintains these links automatically, and restricts access to every object based on the user ID. The system restricts access to objects based on the user ID and tenant. When a user requests data, the system automatically applies a tenancy filter to ensure it retrieves only information corresponding to the user's tenant.

In some embodiments, the system encrypts every attribute of customer data within the application before it is stored in the database. This is a fundamental design characteristic of the system. The system relies on the Advanced Encryption Standard (AES) algorithm with a key size of 256-bits. The system can achieve this encryption because it is an in-memory object-oriented application as opposed to a disk-based RDBMS application. Specifically, the system's metadata is interpreted by the OMS and stored in memory. All data inserts, updates, and deletes are committed to a persistent store on a MySQL database. This unique architecture means the system operates with only a few dozen database tables. By contrast, a RDBMS-based application requires tens of thousands of tables, making complete database encryption impractical due to its detrimental impact on performance.

In some embodiments, users access the system via the internet protected by Transport Layer Security (TLS). This secures network traffic from passive eavesdropping, active tampering, or forgery of messages. The system has also implemented proactive security procedures such as perimeter defense and network intrusion prevention systems. Vulnerability assessments and penetration testing of the system network infrastructure are also evaluated and conducted on a regular basis by both internal system resources and external third-party vendors.

In some embodiments, the system's master production database is replicated in real-time to a slave database maintained at an offsite data center. A full backup is taken from this slave database each day and stored at the offsite data center facility. The system's database backup policy requires database backups and transaction logs to be implemented so that a database may be recovered with the loss of as few committed transactions as is commercially practicable. Transaction logs are retained until there are two backups of the data after the last entry in the transaction log. Database backups of systems that implement interfaces must be available as long as necessary to support the interfacing systems. This period will vary by system. Backups of the database and transaction logs are encrypted for any database which contains customer data. This ensures that in an unlikely case of reported unauthorized change to an application data, The system can retrieve the last good known version and restore the good data while the unauthorized access is stopped from making further changes.

In some embodiments, internally, within application, each transaction committed by business logic is audited for any change and audit logs created. Business logic data would be reconciled with blockchain data and any discrepancies could be tied to the user that made the change, what was changed, and when it was changed. Any discrepancy would be proactively fixed upon detection.

In some embodiments, the system is configured to receive an indication to share data in a block and to mark the block as sharable in the metadata information associated with the block. In particular, the system is configured to protect a user or a candidate's privacy by providing a mechanism for setting permissions for certain information to be shared while other information remains private. In some embodiments, permissions are set to be shared with selected users or entities and not others. An embodiment of a method that includes setting permissions for sharing data is further described with respect to the following figure.

Figure 5:
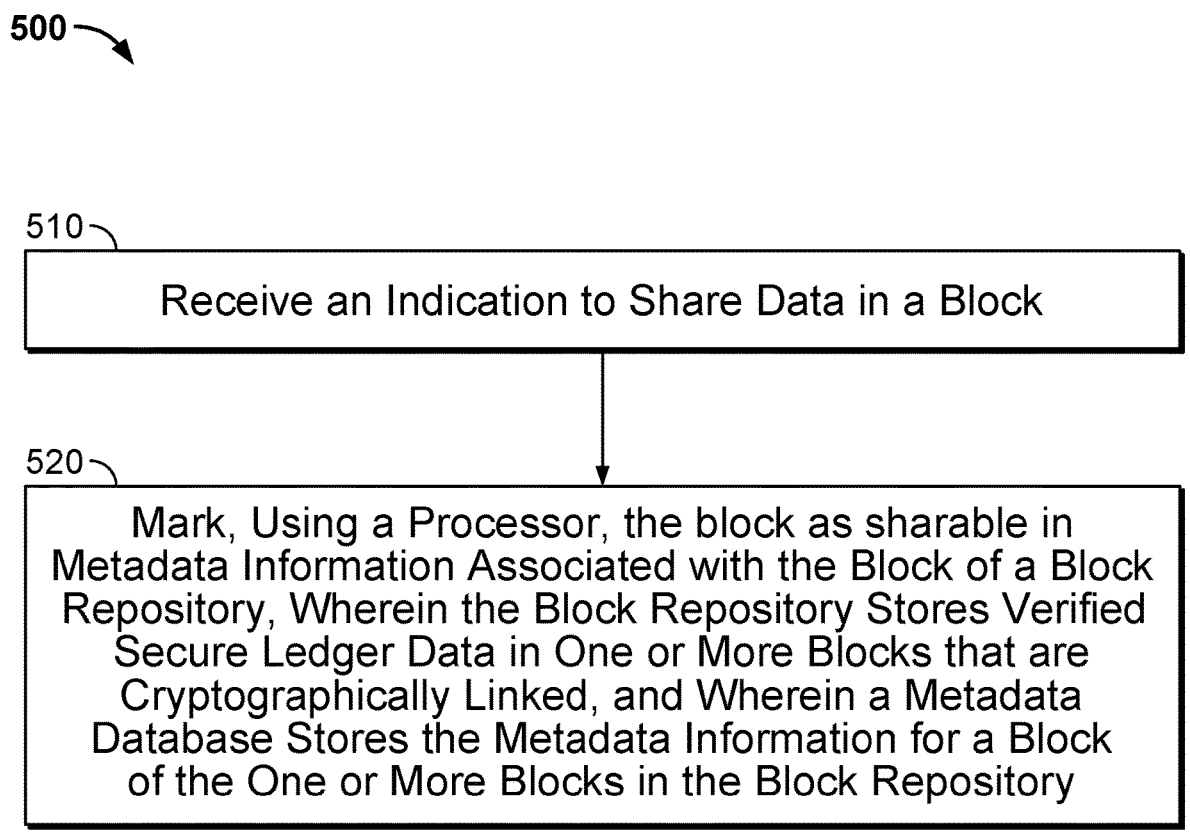
FIG. 5 is a flowchart of an exemplary method 500 for ledger generation and storage for trusted recall that can be performed by exemplary systems depicted in FIGS. 1A-1B that includes receiving an indication to share data in a block and marking the block as sharable.

FIG. 5 is a flowchart of an exemplary method 500 for ledger generation and storage for trusted recall that can be performed by exemplary systems depicted in FIGS. 1A-1B that includes receiving an indication to share data in a block and marking the block as sharable. More specifically, as shown in FIG. 5, the method 500 includes receiving an indication to share data in a block at 510. In some cases, the indication is provided by a user seeking to establish permissions for certain data to be shared.

At 520, the method 500 includes marking, using the processor, the block as sharable in metadata information associated with the block in a block repository. As in the previous examples, the block repository stores verified secure ledger data in one or more blocks that are cryptographically linked and a metadata database stores the metadata information for the block of the one or more blocks in the block repository.

Although not shown in FIG. 5, in some embodiments the method further comprises causing a display of a sharable display indication.

Once a candidate profile that includes verified, secure ledger data has been stored in blocks that are cryptographically linked in a block repository or blockchain as described herein, the system is configured to enable a user to retrieve components of the candidate profile, including retrieving a candidate's verified and trusted information. The profile components that are retrieved and displayed depend for example on flags and/or indications (stored as metadata) used to indicate whether data stored in a block has been reported as accurate or inaccurate or to indicate whether a user has given permission to share the block with others.

In some embodiments, the system receives an indication to retrieve a candidate's verified and trusted information associated with or corresponding to a candidate ID. In response to the indication, the system retrieves the blockchain Merkel root mapped to the candidate ID and initiates a query into the block repository or blockchain. All blocks in the block repository or blockchain that are tagged with a special tag marked for the candidate profile (e.g., based on the candidate ID associated with or corresponding to the candidate profile) are read into a system memory and ordered in a chronological order of their creation. The block contents of each tagged block are then passed onto a task that the user initiated from a user display.

In some cases, a user display is a component of a system such as system 100 as described with respect to FIG. 1 (e.g., Display 103). In other cases, a system used by a participating node in a private/permissioned network (e.g., institutions, companies, or other entities that publish candidate information on a private cryptographically encrypted data repository) will include a user display. For example, the recruiting system 130 or the candidate system 131 shown in FIG. 1B (or any other system used by an institution, corporation, or other participating node) includes a user display for displaying candidate information in a candidate profile and for receiving input or requests related to or associated with a candidate profile.

As will be described in more detail below, some embodiments of a system described herein for ledger generation and storage for trusted recall are configured to display candidate information in a candidate profile in a user display. In particular, the system is configured to display various views of candidate information in the candidate profile.

As one example, an embodiment of a view in a user display includes cryptographically stored information only, wherein only the parts of the candidate profile that are captured in the block repository or blockchain (e.g., Block Repository 120 of FIG. 1A or Blockchain 170 of FIG. 1B) are displayed for viewing by a user. This view may not display certain information the candidate acquired but that did not get stored as block content in a block in the block repository. In particular, certain information provided by entities who are not participating nodes in the private/permissioned network or blockchain (e.g., Block Repository 120) will not be stored as block content as cryptographically stored information.

For instance, in the example described above with respect to FIG. 3B, Jane Doe's completion of a Master of Science degree in Computer Science from Graduate Educational Institution 330 is unverified information that is not cryptographically authenticated by the blockchain, as is Jane Doe's employment at Second Corporation 350. Consequently, a view that includes cryptographically stored information only will not display Jane Doe's degree from Graduate Educational Institution 330, nor will it display Jane Doe's employment at Second Corporation 350.

In another example, an embodiment of a view in a user display includes overlaying cryptographically stored information with additional candidate information. In some cases, additional candidate information is provided by a candidate, such as a candidate-provided resume, or is obtained from another source such as a third party (e.g., background check). In some cases, as will be shown in FIG. 6 below, an output interface having a user display is configured to provide indications of verified and trusted parts or profile components of a candidate profile along with a confidence level associated with each of the verified and trusted profile components. In addition, in some embodiments, the system is configured to automatically add additional background information retrieved from a most recent background check of the candidate.

In this case, the system parses additional information provided by the candidate (e.g., a candidate-provided resume) to generate profile components, arranges the profile components in chronological order, matches the profile components to counterpart cryptographically stored data, and displays the profile components and the cryptographically stored data, in chronological order on the same view. In some cases, the profile components and cryptographically stored data are displayed in a different order, for example, by sorting the components and data based on type (e.g., by area, industry, field, location or any other applicable type relevant for employment purposes). In addition, in some cases, the profile components and cryptographically stored data are displayed in a manner that distinguishes between what is a profile component (provided by the candidate and not cryptographically authenticated or stored) and what is cryptographically stored data (valid, accurate, true, verified, or cryptographically authenticated). For example, each type of data (i.e., candidate provided data and cryptographically stored data) is separated or distinguished by using different fonts or colors or any other method to distinguish one type of data from the other type of data. The following figure depicts an example of an embodiment of a view obtained after the system has parsed additional profile components for display with cryptographically stored data.

Figure 6:
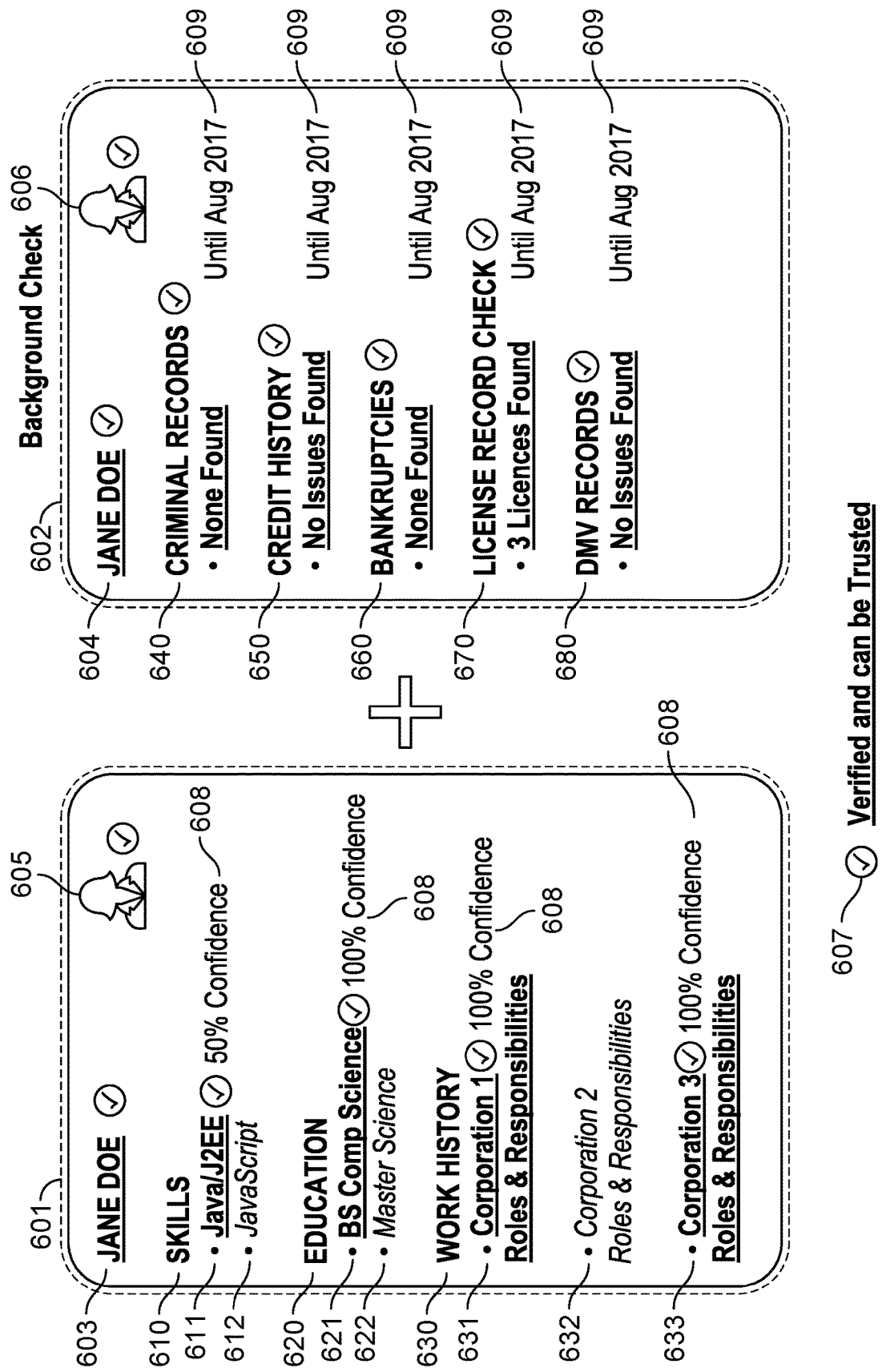
FIG. 6 shows an embodiment of a view obtained by overlaying cryptographically stored information with additional candidate information as described above.

FIG. 6 shows an embodiment of a view obtained by overlaying cryptographically stored information with additional candidate information as described above. As shown in FIG. 6, a user display 601 includes candidate profile information retrieved from one or more blocks that are cryptographically linked for trusted storage and recall along with unverified information as described with respect to the example of FIGS. 3A-3B. In particular, the user display 601 includes personal information such as the candidate's name, Jane Doe at 603, a symbol indicating the candidate's gender at 605, and information relevant for purposes of recruitment, hiring, and employment. In this example, the candidate profile information is shown sorted into categories designated by the headings including skills at 610, education at 620, and work history at 630. Within each category, specific experience and background (e.g., acquired skills and experience obtained from the completion of life events as described with respect to FIGS. 3A-3B) are displayed on user display 601. In this case, under the heading of skills at 610, the displayed candidate profile information includes Java/J2EE at 611 and JavaScript at 612. Under the heading of education at 620, the displayed candidate profile information includes a Bachelor of Science degree in Computer Science (e.g., BS Comp Science at 621) and a Master of Science degree (e.g., Master Science at 622). Finally, under the heading of work history at 630, the displayed candidate profile information includes the candidate's roles and responsibilities at a first corporation (e.g., Corporation 1 at 631), a second corporation (e.g., Corporation 2 at 632), and a third corporation (e.g., Corporation 3 at 633).

In the example shown, a valid flag indicates whether data retrieved from the block has been reported as accurate or inaccurate. Here, a valid flag is displayed an icon of a checkmark noted at 607, which indicates which profile components are verified and can be trusted. Additionally, for each profile component having a valid flag, a confidence level at 608 is displayed indicating how reliable the source that provided the profile component is with respect to providing accurate information.

In this case, the profile component of the skill Java/J2EE at 611 is indicated as verified data as shown by a valid flag, with a confidence level of 50% based on the source of this profile component. However, the skill JavaScript at 612 is shown in this display as unverified. Similarly, Jane Doe's completion of a Bachelor of Science degree in Computer Science (e.g., BS Comp Science at 621) is verified data as shown by a valid flag, with a confidence level of 100% based on the source of this profile component, which in this case, is the participating node, Undergraduate Educational Institution 320 as shown in FIG. 3B. Recall that participating nodes in a private/permissioned network include institutions, companies, or other entities that publish candidate information (e.g., education, hiring, promotion, and other candidate information) on their own databases as well as on a private cryptographically encrypted data repository (e.g., Block Repository 120 of FIG. 1A or Blockchain 170 of FIG. 1B) with a valid and signed certificate. Thus, because Jane Doe's completion of an undergraduate degree from Undergraduate Education Institution 320 of FIG. 3B is retrieved from cryptographically stored data, a high confidence level is associated with this profile component. In contrast, Graduate Educational Institution 330 of FIG. 3B is not a participating node and thus, candidate information related to this institution was not cryptographically stored in the blockchain after Jane Doe's completion of her graduate studies. As a result, Jane Doe's Master of Science degree at 622 acquired from Graduate Educational Institution 330 of FIG. 3B is unverified data and is therefore displayed with no valid flag and no confidence level.

Finally, note that Jane Doe's employment at Corporation 1 at 631 and Corporation 3 at 633 respectively are both shown as verified data indicated by valid flags with confidence levels of 100% (shown at 608) based on the sources of these profile components. In this case, both Corporation 1 and Corporation 3 are participating nodes in a private/permissioned network that published Jane Doe's employment history on a private cryptographically encrypted data repository and thus, a high confidence level is associated with each of these profile components. On the other hand, because Corporation 2 is not a participating node, candidate information related to this corporation was not cryptographically stored in the blockchain after Jane Doe's completion of her employment. As a result, Jane Doe's roles and responsibilities in her employment at Corporation 2 at 632 is unverified data and is therefore displayed with no valid flag and no confidence level.

FIG. 6 also depicts a display of additional candidate information obtained in this case from a background check, which is displayed on a user display 602. The user display 602 includes background check data associated with the candidate and retrieved from one or more blocks (e.g., the candidate profile) that are cryptographically linked for trusted storage and recall. In this case, the system previously captured and stored the additional candidate information by creating a block of data for every background check component including but not limited to education, skills, work history, DMV, bankruptcies, credit history, criminal records, and other background check data obtained via a background check on the candidate. Each block created for each background component was stored and linked to an ID corresponding to or associated with the candidate (e.g., the candidate ID) for later retrieval.

In particular, the system retrieves the background check data from the block repository and displays the background check profile components on user display 602. As shown in FIG. 6, the user display 602 includes personal information such as the candidate's name, Jane Doe 604 on user display 602, a symbol indicating the candidate's gender at 606, and information obtained from the background check. In this example, the background check components are displayed along with the results of the background check for each component. For example, criminal records are shown as "none found" at 640, credit history is shown as "no issues found" at 650, bankruptcies are shown as "none found" at 660, a license record check shows "3 licenses found" at 670, and DMV records are shown as "no issues found" at 680. In addition, because the each background check component and result is retrieved from cryptographically stored data in the block repository, each background check component and result is shown as verified and trusted data (by the valid flag next to each background check component) and further includes a date at 609 establishing a time for which the background check verification is valid.

The embodiments of views and displays as described above including the user displays shown in FIG. 6 can be accessed by via a display including for example, Display 103 of FIG. 1A, or displays provided in other systems (e.g., recruiting system 130, candidate system 131, and other systems at institutions, corporations, or other participating nodes using a blockchain-based storage system) that are connected to or communicate with an application server (e.g., application server 150 of FIG. 1B) via a network (e.g. network 140 of FIG. 1B). These displays can be part of an output interface (e.g., a graphical user interface for displaying information) or an input interface (e.g., a graphical user interface for inputting information and/or receiving requests). Examples of an input interface for receiving candidate information and/or other inputs and requests and an output interface for displaying candidate information or other information in response to inputs and requests are shown in the following figures.

Figure 7:
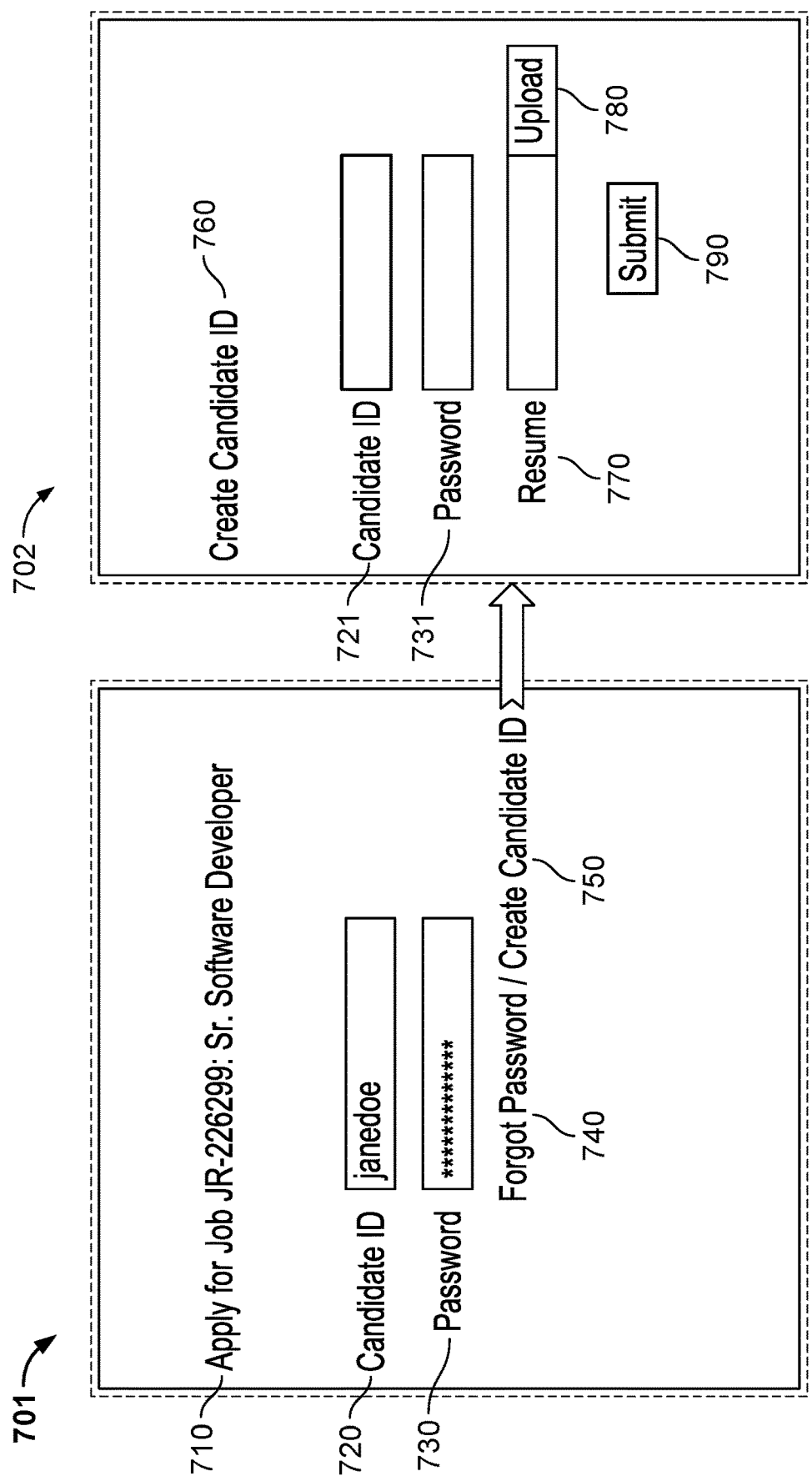
FIG. 7 shows an exemplary embodiment of an input interface for receiving candidate information.

FIG. 7 shows an exemplary embodiment of an input interface for receiving candidate information. As shown in FIG. 7, an input interface (for example, as part of a candidate system 131 of FIG. 1B on a candidate's side) is configured to receive a request from a candidate. For instance, in the case where a candidate seeks to apply for a job, the input interface includes view 701 on a user display that includes job identifier or job ID 710 associated with or corresponding to the job for which the candidate is applying, a field to enter candidate identifier or candidate ID 720 (e.g., "janedoe"), which uniquely identifies the candidate profile, and a field to enter password 730. View 701 also includes a selection element allowing the user to click on or select "Forgot Password" 740, which allows a user to reset his or her password in order to access the system. Finally, in the event that a candidate profile does not yet exist for a candidate, a selection element allowing the user to click on or select "Create Candidate ID" 750 allows the user to begin a process of generating a candidate profile associated with or corresponding to a candidate ID.

For example, as shown in FIG. 7, the input interface includes view 702, resulting in this case from a user clicking on or selecting "Create Candidate ID" 750 in view 701. Here, view 702 includes "Create Candidate ID" 760 and also includes field 721 for the user to enter a candidate ID and field 731 for the user to enter a password. Additionally, view 702 also includes field 770 for the user to upload a resume (as provided by a selection element "Upload" 780). Once the user selects "Upload" 780, the system allows the user to select his or her resume as a file to be uploaded. After the user has filled in the fields for a candidate ID (field 721), a password (field 731), and resume (field 770), which in some cases is an optional field, the user can then click on or select a selection element "Submit," which sends the information inputted by the user (e.g., a request to create a block content as described herein) to the system for processing to generate a candidate profile.

Figure 8:
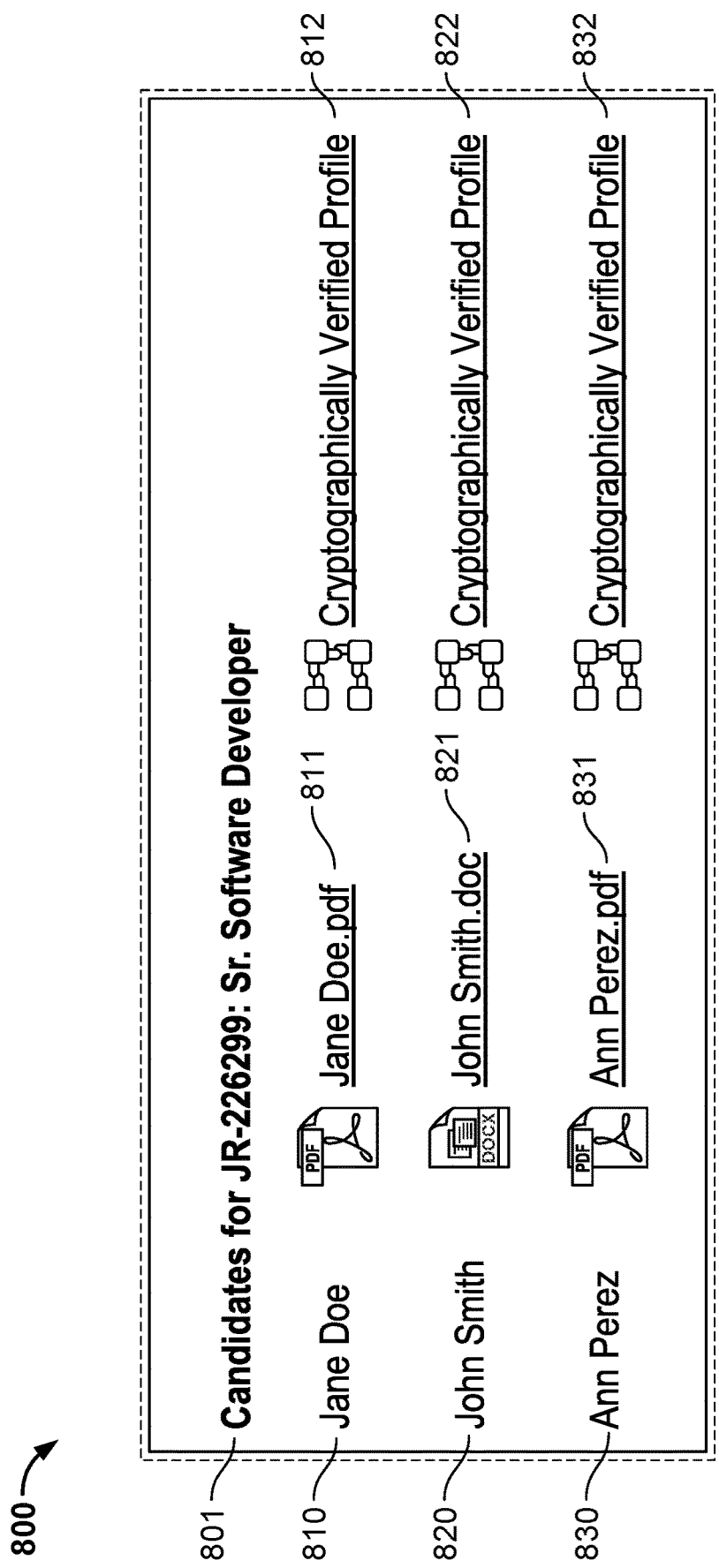
FIG. 8 shows an exemplary embodiment of an input interface for receiving a request to view or retrieve candidate information.

FIG. 8 shows an exemplary embodiment of an input interface for receiving a request to view or retrieve candidate information. As shown in FIG. 8, input interface 800 (for example, as part of a recruiting system 130 of FIG. 1B on a recruiter's or hiring manager's side) is configured to receive a request from a user (e.g., a recruiter or hiring manager). In the example shown, input interface 800 includes heading 801 designating that the information being displayed are candidates for a particular position having a job number and description (in this case, "Candidates for JR-226299: Sr. Software Developer"). Here, three different candidates are shown: Jane Doe at 810, John Smith at 820, and Ann Perez at 830. Thus, in this case, the system has retrieved personal information (e.g., the candidate's name) from the candidate information in candidate profiles stored in a cryptographically encrypted data repository (e.g., Block Repository 120 of FIG. 1A or Blockchain 170 of FIG. 1B).

The input interface 800 also includes selection elements (e.g., buttons or links) that when clicked or selected by a user enables the user (e.g., a recruiter or hiring manager) to retrieve and display a document submitted by or associated with the candidate and a candidate profile. In this particular example, a resume or cover letter submitted by the candidates Jane Doe, John Smith, and Ann Perez can be selected via the selection elements shown as "Jane_Doe.pdf" at 811, "John Smith.doc" at 821 and "Ann Perez.pdf" at 831. Additionally, selection elements shown at 812, 822, and 832 respectively enable a user to retrieve and view candidate profiles associated with or corresponding to candidates Jane Doe, John Smith, and Ann Perez. In this manner, a user is able to retrieve and displaying true and verified candidate information, distinguishing it from unverified information, for various purposes including recruiting or hiring, or for their own internal needs.

As described above, the disclosed technique provides a solution to the problem presented by an inability to trust and verify data critical in certain applications by providing a system and method of storing, retrieving, and displaying true and verified candidate information that companies can use for various purposes including recruiting or hiring, or for their own internal needs. Using the disclosed technique, institutions, companies, and other participating entities are able to publish candidate information (e.g., education, hiring, promotion, and other candidate information) on their own databases as well as on a blockchain-based storage such as a private cryptographically encrypted data repository with a valid and signed certificate. An ability for trusted recall including retrieving candidate information from a cryptographically encrypted data repository and displaying cryptographically-authenticated information in a special way that separates it from non-verified, non-blockchain, authenticated information provides a unique service to candidates, recruiters, and hiring managers that enables them to view trusted and verified candidate profile saving them significant time, effort, and money.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for ledger data, comprising:
a block repository, wherein the block repository stores verified secure ledger data in two or more blocks that are cryptographically linked, wherein the ledger data comprises candidate information;
a metadata database, wherein the metadata database stores metadata information for the two or more blocks in the block repository; and
a processor configured to:
receive a request to create a block content;
determine the block content for a block to be stored in the block repository and metadata content to be stored in the metadata database associated with the block to be stored in the block repository, wherein the metadata content includes two or more flags and source information, wherein the two or more flags comprises a valid flag and a share flag, and wherein the share flag indicates whether a candidate has given permission to make the block visible in a candidate profile;
broadcast the newly-created block to participating nodes in a private/permissioned network, wherein the participating nodes include institutions, companies, or both, and wherein the participating nodes in the private/permissioned network are configured to have an opportunity to approve the newly-created block and the metadata content associated with the block; and
upon receiving an approval from one of the participating nodes:
mark, via the valid flag, the block as being verified in the metadata content; and
store the metadata content in the block repository.

2. A system as in claim 1, wherein the processor is further configured to provide a flag display indication of the two or more flags for display to the candidate.

3. A system as in claim 1, wherein the valid flag indicates whether data stored in the block has been reported as inaccurate.

4. A system as in claim 1, wherein the source information comprises information on who provided a base content of the block content for the block.

5. A system as in claim 4, wherein the block content comprises the base content, a block ID, and a previous block ID.

6. A system as in claim 1, wherein the metadata content is provided to be displayed to a user.

7. A system as in claim 1, wherein the metadata content also includes a block reference ID.

8. A system as in claim 7, wherein the block reference ID comprises a hash.

9. A system as in claim 1, wherein the metadata content also includes a timestamp.

10. A system as in claim 1, wherein the metadata database includes a chain metadata.

11. A system as in claim 10, wherein the chain metadata includes one or more of the following: a unique system ID, a chain root ID, and a forget-me flag.

12. A system as in claim 11, wherein the forget-me flag indicates whether a user has chosen to forget a chain associated with the block.

13. A system as in claim 1, wherein the metadata database includes a confidence metadata, wherein the confidence metadata is calculated based at least in part on a source for the block content stored in the block.

14. A system as in claim 1, wherein the processor is further configured to store the block content as the block in the block repository.

15. A system as in claim 14, wherein the block is stored linked to a previous block using a previous block ID.

16. A system as in claim 1, wherein the processor is further configured to read the block content from the block repository in response to a request by a requestor.

17. A system as in claim 16, wherein reading the block content includes reading the metadata content associated with the block.

18. A system as in claim 17, wherein the block content is read or provided to the requestor based at least in part on the two or more flags.

19. A system as in claim 18, wherein the block content is not provided to the requestor in response to a forget-me determination that a forget-me flag is true for a block chain associated with the block.

20. A system as in claim 18, wherein the block content is not provided to the requestor in response to a not valid determination that a valid flag is not true for the block.

21. A system as in claim 18, wherein the block content is not provided to the requestor in response to a not share determination that the share flag is not true for the block.

22. A method for a ledger data system, comprising:
receiving a request to create a block content;
determining, using a processor, the block content for a block to be stored in a block repository and metadata content to be stored in a metadata database associated with the block, wherein the metadata content includes two or more flags and source information, wherein the block repository stores verified secure ledger data in two or more blocks that are cryptographically linked, wherein the ledger data comprises candidate information, wherein the metadata database stores metadata information for a block of the two or more blocks in the block repository, wherein the two or more flags comprises a valid flag and a share flag, and wherein the share flag indicates whether a candidate has given permission to make the block visible in a candidate profile;
broadcasting the newly-created block to participating nodes in a private/permissioned network, wherein the participating nodes include institutions, companies, or both, and wherein the participating nodes in the private/permissioned network are configured to have an opportunity to approve the newly-created block and the metadata content associated with the block; and
upon receiving an approval from one of the participating nodes:
  marking via the valid flag the block as being verified in the metadata content; and
  storing the metadata content in the block repository.

23. A computer program product for a ledger data system, the computer program product being embodied in a non-transitory computer readable storage medium and comprising computer instructions for:
receiving a request to create a block content;
determining, using a processor, the block content for a block to be stored in a block repository and metadata content to be stored in a metadata database associated with the block, wherein the metadata content includes two or more flags and source information, wherein the block repository stores verified secure ledger data in two or more blocks that are cryptographically linked, wherein the ledger data comprises candidate information, wherein the metadata database stores metadata information for a block of the two or more blocks in the block repository, wherein the two or more flags comprises a valid flag and a share flag, and wherein the share flag indicates whether a candidate has given permission to make the block visible in a candidate profile;
broadcasting the newly-created block to participating nodes in a private/permissioned network, wherein the participating nodes include institutions, companies, or both, and wherein the participating nodes in the private/permissioned network are configured to have an opportunity to approve the newly-created block and the metadata content associated with the block; and
upon receiving an approval from one of the participating nodes:
  marking, via the valid flag, the block as being verified in the metadata content; and
  storing the metadata content in the block repository.

* * * * *

UNITED STATES PATENT AND TRADEMARK OFFICE
CERTIFICATE OF CORRECTION

PATENT NO. : 11,093,479 B2
APPLICATION NO. : 16/182406
DATED : August 17, 2021
INVENTOR(S) : Parvinder Singh Thapar, Bradley Hoyle and Dirk Nicholas Dougherty It is certified that error appears in the above-identified patent and that said Letters Patent is hereby corrected as shown below:

On the Title Page

Column 2, Item (56), Other Publications, cite No. 1, delete
"Grech, Alexander and A. Camilleri. "Blockchain in Education." (2017).
https://web.archive.org/web/20171117085708/https://publications.jrc.ee.europa.eu/repository/
bitstream/JRC108255/jrc108255_blockchain_in_education(1).pdf (Year: 2017)" and insert
--Grech, Alexander and A. Camilleri. "Blockchain in Education." (2017).
https://web.archive.org/web/20171117085708/https://publications.jrc.ec.europa.eu/repository/
bitstream/JRC108255/jrc108255_blockchain_in_education(1).pdf (Year: 2017)--, therefor.

In the Claims

In Column 29, Line(s) 27, Claim 22, after "marking", insert --,--.
In Column 29, Line(s) 27, Claim 22, after "flag", insert --,--.

Signed and Sealed this
Fourth Day of October, 2022

Katherine Kelly Vidal
*Director of the United States Patent and Trademark Office*